US012786937B2

(12) United States Patent
Liu et al.

(10) Patent No.: US 12,786,937 B2
(45) Date of Patent: Nov. 3, 2026

(54) SIDELINK TRANSFER AND ROUND TRIP TIME POSITIONING

(71) Applicant: ZTE Corporation, Shenzhen (CN)

(72) Inventors: Juan Liu, Shenzhen (CN); Chuangxin Jiang, Shenzhen (CN); Mengzhen Li, Shenzhen (CN); Junpeng Lou, Shenzhen (CN); Qi Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 284 days.

(21) Appl. No.: 18/675,415

(22) Filed: May 28, 2024

(65) Prior Publication Data

US 2024/0323899 A1 Sep. 26, 2024

Related U.S. Application Data

(63) Continuation of application No. PCT/CN2022/084304, filed on Mar. 31, 2022.

(51) Int. Cl.
*H04W 64/00* (2009.01)
*G01S 13/76* (2006.01)

(52) U.S. Cl.
CPC ........... *H04W 64/00* (2013.01); *G01S 13/765* (2013.01)

(58) Field of Classification Search
CPC ............................. H04W 64/00; G01S 13/765
USPC ....................................................... 455/456.1
See application file for complete search history.

(56) References Cited

U.S. PATENT DOCUMENTS

| | | | | |
|---|---|---|---|---|
| 10,327,109 | B1 | 6/2019 | Maheshwari et al. | |
| 2018/0035448 | A1* | 2/2018 | Gupta | H04W 72/23 |
| 2018/0132198 | A1 | 5/2018 | Zhang et al. | |
| 2019/0274121 | A1 | 9/2019 | Wu et al. | |
| 2021/0211219 | A1* | 7/2021 | Sarkis | H04L 5/0044 |
| 2021/0377699 | A1 | 12/2021 | Choi et al. | |
| 2024/0031975 | A1* | 1/2024 | Baek | H04W 4/40 |
| 2024/0302480 | A1* | 9/2024 | Bao | G01S 5/0072 |

(Continued)

FOREIGN PATENT DOCUMENTS

| | | | |
|---|---|---|---|
| CN | 111093154 | A | 5/2020 |
| CN | 113016159 | A | 6/2021 |
| CN | 114007185 | A | 2/2022 |

(Continued)

OTHER PUBLICATIONS

Chinese-language Office Action issued in Chinese Application No. CN 202280089102.8 dated Jul. 12, 2025, with English translation (16 pages).

(Continued)

*Primary Examiner* — Qutbuddin Ghulamali
(74) *Attorney, Agent, or Firm* — Crowell & Moring LLP

(57) ABSTRACT

Sidelink based communications include communications between equipment ("UE") and/or with a basestation. The sidelink communications may include certain sidelink information from a communication device that includes UE information, positioning/location information, or other capabilities that are used for the sidelink communications. Sidelink information that is communicated through sidelink communications may be modified based on priority determinations or position reference signals (PRS). There may be a mapping or associating of configurations that are communicated through sidelink communications.

16 Claims, 24 Drawing Sheets

(56) References Cited

U.S. PATENT DOCUMENTS

2025/0380239 A1* 12/2025 Ghimire ................ H04W 24/08

FOREIGN PATENT DOCUMENTS

| | | | |
|---|---|---|---|
| CN | 114222931 | A | 3/2022 |
| WO | WO 2021/133104 | A1 | 7/2021 |
| WO | WO 2021/240479 | A1 | 12/2021 |
| WO | WO 2022/027298 | A1 | 2/2022 |
| WO | WO 2022/055613 | A1 | 3/2022 |

OTHER PUBLICATIONS

Japanese-language Office Action issued in Japanese Application No. 2024-527151 dated Sep. 12, 2025, with English translation (11 pages).

Extended European Search Report issued in European application No. 22934156.5, dated Nov. 27, 2024, 12 pages.

Japanese-language Search Report issued in Japanese Application No. 2024-527151 dated Mar. 27, 2025 with English translation (17 pages).

International Search Report and Written Opinion, dated Oct. 28, 2022, pp. 1-7, issued in International Application No. PCT/CN2022/084304, National Intellectual Property Adminstration, Beijing, China.

* cited by examiner

SIDELINK TRANSFER AND ROUND TRIP TIME POSITIONING

This application is a continuation application of PCT International Application No. PCT/CN2022/084304, filed with the China National Intellectual Property Administration, PRC on Mar. 31, 2022, wherein the content of each of the above-referenced applications is incorporated herein by reference in its entirety.

TECHNICAL FIELD

This document is directed generally to wireless communications. More specifically, the wireless communications including communications of sidelink information.

BACKGROUND

Wireless communication technologies are moving the world toward an increasingly connected and networked society. Wireless communications rely on efficient network resource management and allocation between user mobile stations and wireless access network nodes (including but not limited to wireless base stations). A new generation network is expected to provide high speed, low latency and ultra-reliable communication capabilities and fulfil the requirements from different industries and users. User mobile stations or user equipment (UE) are becoming more complex and the amount of data communicated continually increases. With the development of wireless multimedia services, demands of high data rate services are increasing as well as the requirements for system capacity and coverage of conventional cellular network. In addition, increased usage for public safety, social network, short distance data sharing, local advertisement, and other demands of proximity services which allow people to communicate with adjacent people or objects are also increasing. Device-to-device (D2D) communication technology may serve such demands. In order to improve communications and meet reliability requirements for the vertical industry as well as support the new generation network service, communication improvements for D2D should be made.

SUMMARY

This document relates to methods, systems, and devices for sidelink communications between devices. Sidelink based communications include communications between equipment ("UE") and/or with a basestation. The sidelink communications may include certain sidelink information from a communication device that includes UE information, positioning/location information, or other capabilities that are used for the sidelink communications. Sidelink information that is communicated through sidelink communications may be modified based on priority determinations or position reference signals (PRS). There may be a mapping or associating of configurations that are communicated through sidelink communications.

In one embodiment, a method for wireless communication includes communicating, by a first communication device, sidelink information. The communicating is from the first communication device to a second communication device. The communicating is from the first communication device to a third communication device through a fourth communication device. The communicating comprises using at least one of a send, a receive, a broadcast, a unicast, a request, a response, a forward, a exchange or a groupcast.

In some embodiments, the sidelink information comprises at least one of: user equipment identification (UEID), positioning information, location information, measurement results, a UE capability, UE's information within its coverage, a zone ID, a response time, a response period, a sidelink positioning reference signal (SL-PRS) configuration, a synchronization information, a Rx-Tx time difference, number of Rx-Tx time difference, a reference signal timing difference (RSTD), a relative time of arrival (RTOA), a time stamp, a PRS resource ID, a PRS resource set ID, a beam information, angle information, a information of a positioning method, a information of control information, a configuration of positioning reference signal, a angle indication granularity, a configuration of measurement gap, resources capability for each positioning method, a PRS processing capability, a multi-round trip time (Multi-RTT) measurement capability, a UE PRS quasi co-location (QCL) processing capability, TDOA provide capabilities, AoD provide capabilities, Multi-RTT provide capabilities, a capability of additional Paths Report, a capability of periodical reporting, the maximum number of UE Rx-Tx time difference measurements corresponding to a PRS resource/resource set with each measurement, whether the communication device supports RSRP measurement for Multi-RTT in FRx, a granularity for the communication device Rx-Tx time difference measurements, a RSRP or the difference of RSRP to the reference communication device from other assistant communication device(s) of a communication device, a UE measurement capability, Multi-RTT measurements, a list of communication device or a angle indication manner, where FRx refers to at least one of: FR1, FR2, FR2-1, or FR2-2. The communicating sidelink information or the UE capability comprises at least one of: a capability to communicate with a network, a capability to calculate a positioning location, a capability to send sidelink information to another communication device, a capability to receive sidelink information from another communication device, a capability to exchange the signaling or interact signaling with another communication device, a capability to forward sidelink information about another communication device, a capability to broadcast sidelink information, a capability of receiving sidelink information from another communication device, a capability of coverage of the network, a capability of supporting positioning function, a capability of communicating a positioning reference signal (PRS), a capability of supporting positioning method measurement, a capability to support aperiodic or semi-persistent PRS, a capability to broadcast the sidelink information, a capability of communicating the related Radio Resource Control (RRC) parameter(s), a capability of communicating the control information, a capability of supporting multi-RTT method, a capability of supporting multi-RTT measurement capability, or a capability of supporting a positioning method. The positioning method comprises at least one of: network-assisted GNSS methods, observed time difference of arrival (OTDOA) positioning, WLAN positioning, Bluetooth positioning, terrestrial beacon system (TBS) positioning, Enhanced Cell-ID (ECID), Multiple-Round Trip Time (Multi-RTT), angle of Departure (AoD), Time Difference Of Arrival (TDOA), or Angle of Arrival (AoA).

In some embodiments, the communicating sidelink information includes at least one of: requesting, from the second communication device, the sidelink information, requesting, from the third communication device, the sidelink information, or requesting, from the fourth communication device, the sidelink information. In some embodiments, the communicating sidelink information includes at least one of:

broadcasting, from the first communication device, the sidelink information to at least the second communication device; unicasting, from the first communication device, the sidelink information to at least the second communication device; groupcasting, from the first communication device, the sidelink information to at least the second communication device; broadcasting, from the first communication device, the sidelink information to at least the fourth communication device; broadcasting, from the first communication device, the sidelink information to at least the third communication device; broadcasting, from the fourth communication device, the sidelink information to at least the third communication device; unicasting, from the first communication device, the sidelink information to at least the fourth communication device; unicasting, from the first communication device, the sidelink information to at least the third communication device; unicasting, from the fourth communication device, the sidelink information to at least the third communication device; groupcasting, from the first communication device, the sidelink information to at least the fourth communication device; groupcasting, from the first communication device, the sidelink information to at least the third communication device; or groupcasting, from the fourth communication device, the sidelink information to at least the third communication device. The sidelink information or the positioning information comprises at least a sidelink positioning reference signal (SL-PRS) configuration. The SL-PRS configuration is indicated in control signaling, in a control channel, in other channel(s), or in an Radio Resource Control (RRC) parameter. The control signaling comprises at least one of sidelink control information (SCI), downlink control information (DCI), Medium Access Control Control Elements (MAC CE), Non Access Stratum (NAS), or system information blocks x (SIBx) where x is an integer. The control channel comprises at least one of a physical sidelink control channel (PSCCH), a physical downlink control channel (PDCCH), or a physical uplink control channel (PUCCH). The other channel(s) comprises at least one of a physical sidelink shared channel (PSSCH), a physical downlink shared channel (PDSCH), a physical uplink shared channel (PUSCH), a Physical Broadcast Channel (PBCH), a Physical Sidelink Feedback Channel (PSFCH), or a Physical Sidelink Broadcast Channel (PSBCH). The requesting is from at least one of a Non Access Stratum (NAS), a NAS layer, a high layer, or a physical layer.

In some embodiments, the sidelink information, the positioning information, a configuration of positioning reference signal or a sidelink positioning reference signal (SL-PRS) configuration comprises at least one of a SL-PRS period, a time resource of the SL-PRS, a frequency resource of the SL-PRS, a time gap between the SL-PRS and a sidelink channel, a minimum time gap between the SL-PRS and the sidelink channel, a SL-PRS hop ID, a comb size, a hop ID, a first symbol of the SL-PRS within a slot, a size of the SL-PRS resource in the time domain, a resource-element offset, a reference point, a location of a point A, a combination of the size of the SL-PRS resource in the time domain and the comb size, a SL-PRS sequence ID, a UE ID, a SL-PRS sequence set information, a SL-PRS frequency layer information, a PSFCH configuration, a CandidateResourceType, or a Physical Broadcast set. A unit of the SL-PRS period or a time resource of SL-PRS comprises at least one of a millisecond, a symbol, a set of symbols, a slot, or a set of slots. The SL-PRS period is configured within at least one of a bandwidth part (BWP), a carrier frequency, or a resource pool. The SL-PRS period is set to 0, which results in or means no resource for the SL-PRS. The SL-PRS period is a logical period. The SL-PRS period is associated with the PSFCH configuration. The SL-PRS configuration and the PSFCH configuration are configured in a resource pool.

In some embodiments, the sidelink channel comprises at least one of a physical sidelink shared channel (PSSCH), a physical sidelink shared channel (PSSCH), a Physical Sidelink Feedback Channel (PSFCH), or a Physical Sidelink Broadcast Channel (PSBCH). A unit of the frequency resource of SL-PRS comprises at least one of a Physical Resource block (PRB), a sub-channel, or a Resource element (RE). A size of the SL-PRS resource in the time domain comprise at least one of a number of symbol(s) per SL-PRS Resource, a number of symbol(s) a SL-PRS Resource, a number of symbol(s) per SL-PRS configuration, or a number of symbol(s) a SL-PRS configuration. The SL-PRS Resource or the SL-PRS configuration comprise at least one of a number of symbol(s) per SL-PRS Resource within a slot, a number of symbol(s) per SL-PRS configuration within a slot, a number of symbol(s) a SL-PRS Resource within a slot, or a number of symbol(s) a SL-PRS configuration within a slot. The reference point or the location of the point A comprises at least one of a positioning a frequency layer, a BWP, or a carrier frequency. The reference point or the location of the point A is a parameter provided by a high layer or SCI. The reference point or the location of the point A is associated with at least one of the lowest resource block (RB) index of a sidelink bandwidth part (SL BWP), a lowest RB index of the subchannel with a lowest index in the resource pool, a lowest RB index of a SL carrier frequency, a lowest subchannel index in the resource pool, the lowest subchannel index of a SL BWP, or a lowest subchannel index of a SL carrier frequency. The SL-PRS hop ID refers to a Scrambling ID for sequence hopping of the sidelink positioning reference signal (SL-PRS) configuration. The SL-PRS hop ID is used for a resource pool, a BWP, or a carrier frequency. The combination of the size of the SL-PRS resource in the time domain and the comb size is at least one of {2, 2}, {4, 2}, {6, 2}, {12, 2}, {4, 4}, {12, 4}, {6, 6}, {12, 6}, and {12, 12}. A value of the SL-PRS sequence ID is associated with a value of a user equipment identification (UEID). The SL-PRS sequence ID is used to initialize a value in a pseudo random generator for generation of the SL-PRS sequence for transmission on a SL-PRS Resource. The sidelink information, the positioning information, or a sidelink positioning reference signal (SL-PRS) configuration is configured by at least one of: a high layer parameter, a sidelink control information (SCI), or a NAS parameter. The communication device comprises a user equipment (UE), a network node, a basestation, a local sever, a Transmission/Reception Point (TRP) or a Location Management Function (LMF). The SL-PRS period(s) is associated with the time resource used in a sidelink resource pool, a BWP or a carrier frequency.

In some embodiments, the configuration of positioning reference signal comprises one of periodic, aperiodic, or semi-persistent. The sidelink information or the positioning information comprises one of a positioning of multiple round trip time (multi-RTT), a positioning signal related to a positioning of multiple round trip time (multi-RTT), a communication device list, a Rx-Tx time difference of a communication device, a Rx-Tx time difference, a Rx-Tx time difference measurement, or a parameter or parameter list used by a sixth communication device to provide Multi-RTT measurements to a seventh communication device. The communication device list, a first communication device in the communication device list is used as the reference communication device. A parameter is used to provide assistance data to enable communication device assistance for the multi-RTT. A parameter is used by the communication device to provide location measurements for the multi-RTT, wherein the location measurements are used to determine potential errors, further wherein the location measurements are provided as a list of communication devices. The communication device indicates its capability to support Multi-RTT and to provide Multi-RTT positioning capabilities to an eighth communication device. The sidelink information, the positioning information, a configuration of positioning reference signal or a sidelink positioning reference signal (SL-PRS) configuration is configured at least one of: pre-configured, by Radio Resource Control (RRC) configuration message, or SIBx, where x is an integer. The communicating comprises: a first communication device request second communication device that the recommended reporting granularity for the first communication device Rx-Tx time difference measurements.

In one embodiment, a method for wireless communication includes determining a priority for a sidelink positioning reference signal (SL-PRS), and communicating the SL-PRS based on the determined priority. The determining a priority for the sidelink positioning reference signal (SL-PRS) is based on at least one of a configuration, a default, a scenario, or an indication. The determining establishes that the SL-PRS has a highest priority, for which the communicating prioritizes the SL-PRS before communicating the other signal(s) or channel(s). The determining establishes that the SL-PRS has a lowest priority, for which the communicating prioritizes any other signal(s) or channel(s) before the SL-PRS. The determining a priority for the SL-PRS is based on control signaling, which includes at least one of Radio Resource Control (RRC), Medium Access Control Element (MAC CE), downlink control information (DCI), Non Access Stratum (NAS), Sidelink Control Information (SCI), or system information blocks x (SIBx), where x is an integer. The determined priority comprises a integer number value between 1 and 8, wherein 1 is highest priority, 8 is the lowest priority. The communicating is from a first communication device to a second communication device. The first or second communication device comprises one of a user equipment (UE), a network node, a basestation, a local sever, a Transmission/Reception Point (TRP) or a Location Management Function (LMF). The communicating further comprises at least one of sending, receiving, broadcasting, unicasting, groupcasting, forwarding, requesting, responding, or exchanging. A priority for the SL-PRS is configured by at least one of a high layer parameter, a parameter in Radio Resource Control (RRC), a parameter in sidelink control information (SCI), a parameter in downlink control information (DCI), a parameter in Medium Access Control Elements (MAC CE), a Non Access Stratum (NAS) layer parameter, or a parameter in system information blocks x (SIBx) where x is an integer. The SL-PRS is used for calculating a location. The determined priority for the SL-PRS comprises at least one of the priority for the SL-PRS is higher than a first set of other signal(s) or channel(s), or the priority for the SL-PRS lower than a second set of the other signal(s) or channel(s). The communicating deprioritizes the SL-PRS and communicates the SL-PRS after the second set of the other signal(s) or channel(s). The communicating prioritizes the SL-PRS and communicates the SL-PRS before communicating the first set of the other signal(s) or channel(s). The first set of other signals has no intersection with the second set of other signal(s) or channel(s).

In another embodiment, a method for wireless communication includes communicating through sidelink, a non-zero power positioning reference signal (PRS) or a zero power PRS, or configuring through sidelink, a non-zero power positioning reference signal (PRS) configuration or a zero power PRS configuration. The communicating or the configuring comprises the non-zero power PRS and the zero power PRS. The non-zero power PRS or the zero power PRS is periodic, semi-persistent, or aperiodic. The zero power PRS includes using rate matching or a priority of SL-PRS. A time or the frequency resource of the non-zero power positioning reference signal (PRS) or the zero power PRS is configured by a control signaling. The method further includes determining whether the non-zero power PRS or the zero power PRS is overlapping with a signal(s) or channel(s), and modifying the communicating based on the determination. The modifying includes not transmitting the non-zero power PRS or the zero power PRS when there is overlap or partially overlap. The modifying includes a partial transmission when the determination is that the non-zero power PRS or the zero power PRS at least partially overlap.

In another embodiment, the method further includes determining a priority for the non-zero power PRS or the zero power PRS based on a comparison with the signal(s) or channel(s), and modifying the communicating based on the determined priority. The rate matching is performed with, the signal(s) or channel(s) comprises at least one of: a data signal, a control signal, a DeModulation Reference Signal (DM-RS), a feedback signal, a Demodulation reference signal (DM-RS), a Phase-tracking reference signal(s) (PT-RS), a Channel-state information reference signal (CSI-RS), a Primary synchronization signal (PSS), a Secondary synchronization signal (SSS), a Sounding reference signal (SRS), a Sidelink primary synchronization signal (S-PSS), a Sidelink secondary synchronization signal (S-SSS), a physical sidelink Control channel (PSCCH), a physical downlink Control channel (PDCCH), a physical uplink Control channel (PUCCH), a physical sidelink shared channel (PSSCH), a physical downlink shared channel (PDSCH), a physical uplink shared channel (PUSCH), a Physical Broadcast Channel (PBCH), a Physical Sidelink Feedback Channel (PSFCH), or a Physical Sidelink Broadcast Channel (PSBCH). The time or the frequency resource only for the zero power PRS communicating. The control signaling is included at least one of: sidelink control information (SCI), downlink control information (DCI), Medium Access Control Elements (MAC CE), Non Access Stratum (NAS) layer, or system information blocks x (SIBx), where x is an integer.

In one embodiment, a method for wireless communication includes associating or mapping a set data configuration(s) to a set positioning configuration(s), and communicating, through sidelink, based on the mapping or associating. The set data configuration(s) comprises one or more data configuration(s). The set positioning configuration(s) comprises one or more positioning configuration(s). The communicating comprises at least one of sending, receiving, broadcasting, unicasting, groupcasting, forwarding, requesting, responding, or exchanging. The set of data or positioning configuration(s) comprises or in at least one of the following: a bandwidth part (BWP), a carrier frequency, a resource pool, or an occasion. The set of data configuration(s) may be configured in a bandwidth part (BWP), a carrier frequency, or a resource pool. The set of positioning configuration(s) may be configured in a bandwidth part (BWP), a carrier frequency, or a resource pool. The set of data configuration(s) may be configured in one or more bandwidth part (BWP), one or more carrier frequency, or one or more resource pool. The set of positioning configuration(s) may be configured in one or more bandwidth part (BWP), one or more carrier frequency, or one or more resource pool. The set data configuration(s) or the set positioning configuration(s) is pre-configured, configured by a radio resource control (RRC) configuration message, configured by a sidelink control information (SCI) parameter, configured by a downlink control information (DCI) parameter, configured by a Medium Access Control Elements (MAC CE) parameter, configured by a Non Access Stratum (NAS) parameter or configured by a system information blocks x (SIBx) parameter, where x is an integer.

In some embodiments, the mapping or the associating comprises a mapping or associating ratio, the set data configuration(s), or the set positioning configuration(s). The mapping or associating ratio comprises at least one of a ratio of the set data configuration(s) to the set positioning configuration(s), or a ratio of the set positioning configuration(s) to the set data configuration(s). A value of the mapping or associating ratio is at least one of 1:M, N:1, or M:N, where M and N are integers. The mapping or associating comprises a transmission, indication, sensing, or selecting of the set positioning configuration(s) based on the mapping or associating of the set data configuration(s). The set data configuration(s) or the set positioning configuration(s) is indicated or triggered by a parameter or a set of parameters from at least one of: sidelink control information (SCI) parameters, Radio Resource Control (RRC), downlink control information (DCI), Medium Access Control Elements (MAC CE), Non Access Stratum (NAS), high layer or system information blocks x (SIBx), where x is an integer. The set data configuration(s) is indicated or triggered by the parameter or the set of parameters. The parameter or the set of parameters is associated or mapped to the set of positioning configuration(s). The set data configuration(s) and the mapped or associated positioning configuration(s) is configured or triggered by one or more sidelink control information (SCI), the parameter(s), or the set(s) of parameters. The set positioning configuration(s) is indicated or triggered by the parameter(s) or the set of parameters. The parameter or the set of parameters is associated or mapped to the set of data configuration(s). The set positioning configuration(s) and the mapped or associated data configuration(s) is configured or triggered by one or more sidelink control information (SCI), the parameter(s), or the set(s) of parameters. The triggered the set of positioning configuration(s) may be different from the set of mapped or associated positioning configuration(s). The set of mapped or associated positioning configuration(s) may be in one of the following: in one or more bandwidth part (BWP), one or more carrier frequency, or one or more resource pool. The set of triggered positioning configuration(s) may be in one of the following: in one or more bandwidth part (BWP), one or more carrier frequency, or one or more resource pool. The triggered the set of data configuration(s) may be different from the set of mapped or associated data configuration(s). The set of mapped or associated data configuration(s) may be in one of the following: in one or more bandwidth part (BWP), one or more carrier frequency, or one or more resource pool. The set of triggered data configuration(s) may be in one of the following: in one or more bandwidth part (BWP), one or more carrier frequency, or one or more resource pool.

In some embodiments, the parameter or the set of parameters from at least one of: sidelink control information (SCI) parameters, Radio Resource Control (RRC), downlink control information (DCI), Medium Access Control Elements (MAC CE), Non Access Stratum (NAS), high layer or system information blocks x (SIBx) is indicated by at least one of: a sidelink positioning resource signal (SL-PRS) resource pool index, one or more PRS period(s), a PRS time resource, a PRS frequency resource, a PRS priority, a parameter of deactivation/activation, a time resource of the PRS, a frequency resource of the PRS, a time gap between the PRS and a sidelink channel, a minimum time gap between the PRS and a sidelink channel, a SL-PRS hop ID, a comb size, a hop ID, a first symbol of the PRS within a slot, a size of the SL-PRS resource in the time domain, a resource-element offset, a reference point, a location of the point A, a combination of the size of the PRS resource in the time domain and the comb size, a PRS sequence ID, a PRS sequence set information, a PRS frequency layer information, a resource ID/index, a carrier frequency ID/Index, a BWP ID/Index, a resource set ID/index, or a frequency layer ID/index. The PRS period(s) is associated with the resource reservation interval of the mapped or associated data resource pool. The PRS period(s) is in the unit of at least one of milliseconds (msec), or logical slot(s). The PRS period(s) is converted the from the unit of msec to the unit of logical slot(s). The set data configuration(s) is mapped or associated to P positioning configurations, where P is an integer >1. The P positioning configurations are bundled and one of the P PRS configurations is disabled or invalid, and the other P−1 PRS configuration(s) are disabled or invalid. When the data configuration(s) is not mapped or associated, the data configuration(s) is disabled or invalid.

In some embodiments, when the positioning configuration(s) is not mapped or associated, the positioning configuration(s) is disabled or invalid. The mapping or associating is configured by a communication device. The communication device comprises a user equipment (UE), a network node, a basestation, a local sever, a Transmission/Reception Point (TRP), or a Location Management Function (LMF). When the data or positioning configuration(s) is not mapped or associated, the communication device cannot communicate using the data or positioning configuration(s). When the data or positioning configuration(s) is not mapped or associated, the communication device cannot sense or select. For the parameter of deactivation/activation, a '1' designates activation and a '0' designates deactivation, or a 'O' designates activation and a '1' designates deactivation. The sidelink channel comprises a physical sidelink shared channel (PSSCH), a physical sidelink shared channel (PSSCH), a Physical Sidelink Feedback Channel (PSFCH), or a Physical Sidelink Broadcast Channel (PSBCH). The mapping or associating, an association period is based on a period of PRS. The association period associates a PRS period in the set of the positioning configuration(s) with a data period in set of the data configuration(s).

In one embodiment, a wireless communications apparatus comprises a processor and a memory, and the processor is configured to read code from the memory and implement any of the embodiments discussed above.

In one embodiment, a computer program product comprises a computer-readable program medium code stored thereupon, the code, when executed by a processor, causes the processor to implement any of the embodiments discussed above.

In some embodiments, there is a wireless communications apparatus comprising a processor and a memory, wherein the processor is configured to read code from the memory and implement any methods recited in any of the embodiments. In some embodiments, a computer program product comprising a computer-readable program medium code stored thereupon, the code, when executed by a processor, causing the processor to implement any method recited in any of the embodiments. The above and other aspects and their implementations are described in greater detail in the drawings, the descriptions, and the claims.

DETAILED DESCRIPTION

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 1:
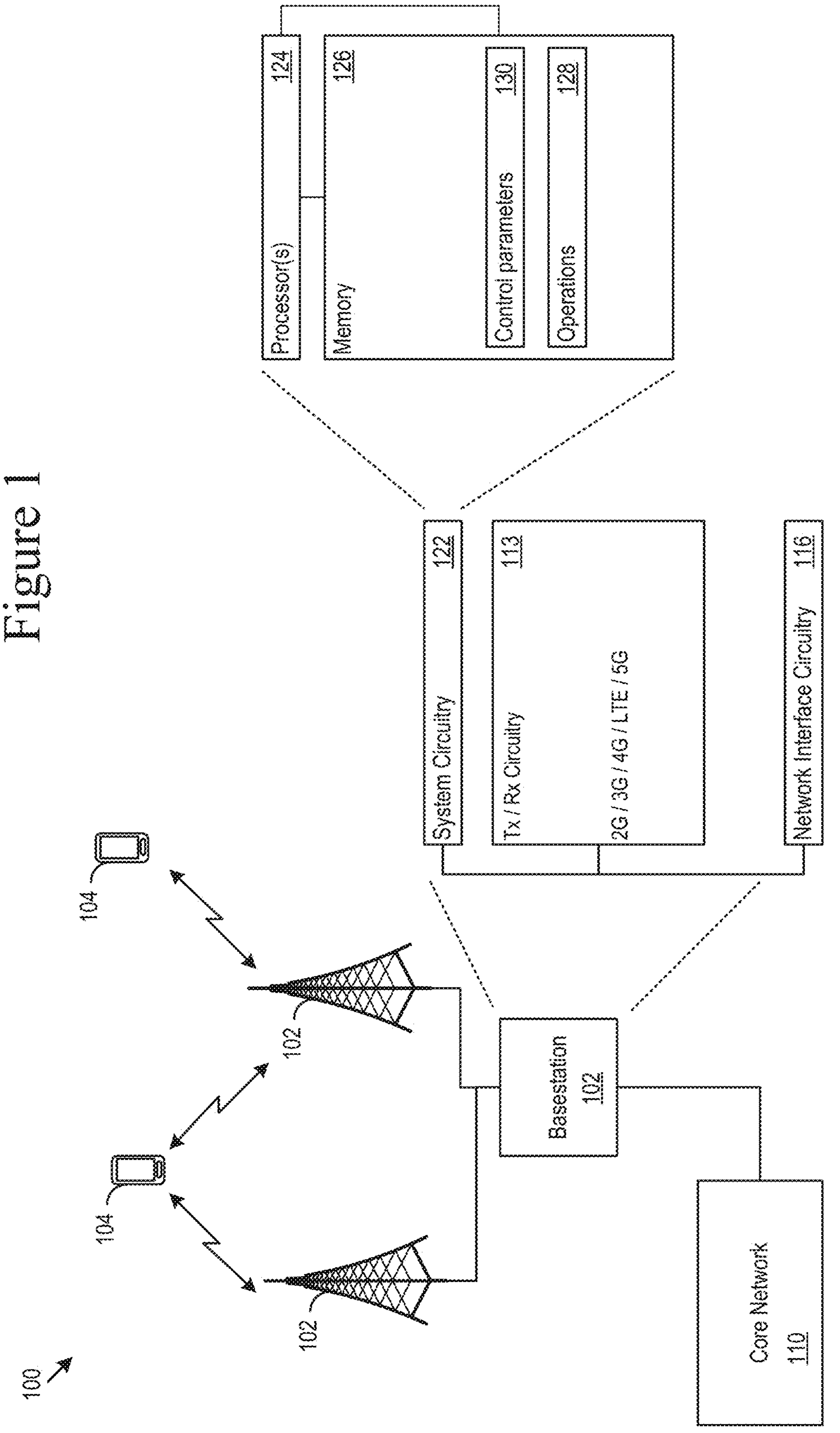
FIG. 1 shows an example basestation.
Figure 2:
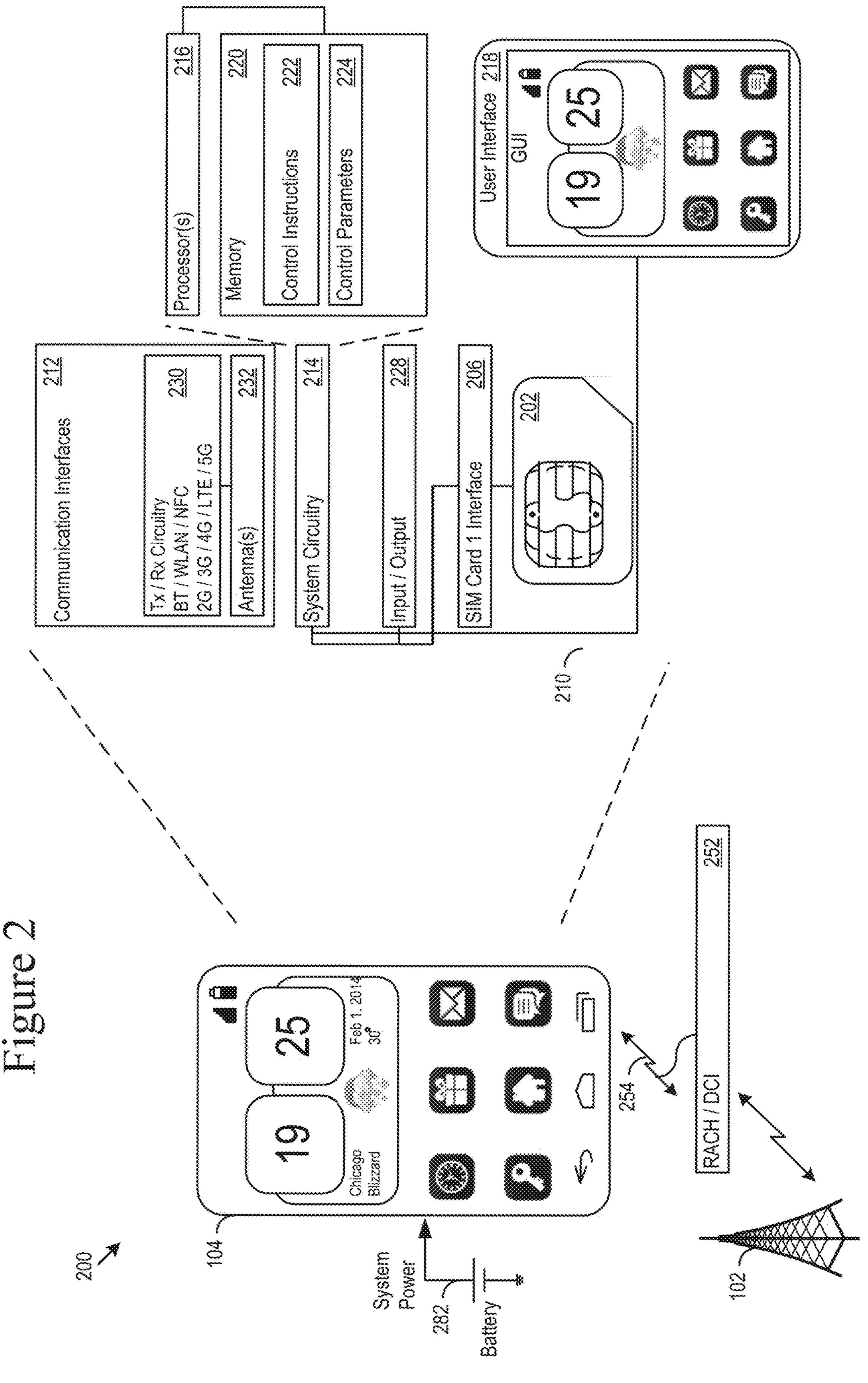
FIG. 2 shows an example random access (RA) messaging environment.

The wireless communications described herein may be through radio access including new radio ("NR") access. Radio resource control ("RRC") is a protocol layer between user equipment ("UE") and the network (e.g. basestation or gNB) at the IP level (Network Layer). There may be various Radio Resource Control (RRC) states, such as RRC connected (RRC_CONNECTED), RRC inactive (RRC_INACTIVE), and RRC idle (RRC_IDLE) state. RRC messages are transported via the Packet Data Convergence Protocol ("PDCP"). The UE can transmit data through a Random Access Channel ("RACH") protocol scheme or a Configured Grant ("CG") scheme or grant scheme. The RACH scheme is merely one example of a protocol scheme for communications and other examples, including but not limited to CG, are possible. FIGS. 1-2 show example radio access network ("RAN") nodes (e.g. basestations) and user equipment and messaging environments. The communications described herein may be specific to sidelink communications, which may also be referred to as device to device ("D2D") communications.

There may be at least two technical schemes including an internet protocol ("IP") layer (Layer 3 or "L3") and an access layer (Layer 2 or "L2") for the sidelink communications. The layer 3 based relay forwards data according to IP information (e.g. IP address or IP port number) of the UE. The layer 2 based relay routes and forwards data of user plane and control plane in access layer, allowing network operator (i.e. core network and/or the BS) to manage the remote UE more effectively.

Sidelink communications may relieve the burden of the cellular network, power consumption of user equipment ("UE") can be reduced, data rates can be increased, and robustness of network infrastructures can be improved, all of which can fulfill the demands of high data rate services and the proximity services. The relay communications or D2D technology may also be referred to as a proximity service ("ProSe") or sidelink communications. An interface between equipment may be known as or referred to as a PC5 interface. PC5 is where the UE directly communicates with another UE over a direct channel without the basestation. In some embodiments, the sidelink-based relay communication may be applied to indoor relay communication, smart farming, smart factory and public safety services. Sidelink may only work depending on the positioning of each of the devices. For example, two user equipment (UE) devices must be in range to engage in sidelink communications. The positioning may also be referred to as ranging, and may include relative positioning and absolute positioning. Based on the positioning, the bandwidth requirements may be different to meet accuracy requirements.

Multi-cell round trip time (RTT) may include a Rx-Tx time difference measurement for the signal of each cell for basestation/UE communications. There may be measurement reports from the UE and basestations that are sent to a location server to determine the round trip time (RTT) of each cell, which can be used to calculate the UE position.

Location management function (LMF) may be used to improve positioning. LMF may receive measurements/assistance information from the basestation and the UE. This may be transmitted via the access and mobility management function (AMF) to calculate the UE position. The LMF may configure the UE via AMF, while the basestation may configure the UE using radio resource control (RRC) protocol.

FIGS. 3*a*-6 show exemplary embodiments for sidelink communications. FIGS. 1-2 show example basestations and user equipment and messaging environments which may be applicable to sidelink communications as described below.

FIG. 1 shows an example basestation 102. The basestation may also be referred to as a wireless network node. The basestation 102 may be further identified to as a nodeB (NB, e.g., an eNB or gNB) in a mobile telecommunications context. The example basestation may include radio Tx/Rx circuitry 113 to receive and transmit with user equipment (UEs) 104. The basestation may also include network interface circuitry 116 to couple the basestation to the core network 110, e.g., optical or wireline interconnects, Ethernet, and/or other data transmission mediums/protocols.

The basestation may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the basestation. For example, the operations may handle random access transmission requests from multiple UEs. The control parameters 130 may include parameters or support execution of the operations 128. For example, control parameters may include network protocol settings, random access messaging format rules, bandwidth parameters, radio frequency mapping assignments, and/or other parameters.

FIG. 2 shows an example random access messaging environment 200. In the random access messaging environment a UE 104 may communicate with a basestation 102 over a random access channel 252. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The mobile device 200 includes communication interfaces 212, system logic 214, and a user interface 218. The system logic 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 104. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements.

Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104. The control parameters 224 provide and specify configuration and operating options for the control instructions 222. The memory 220 may also store any BT, WiFi, 3G, 4G, 5G or other data 226 that the UE 104 will send, or has received, through the communication interfaces 212. In various implementations, the system power may be supplied by a power storage device, such as a battery 282

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

Sidelink Communication Between UEs

Figure 3A:
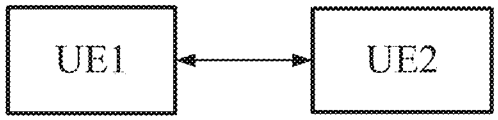
FIG. 3*a* shows an example sidelink communication.

FIG. 3*a* shows an example sidelink communication. Sidelink communication may also be referred to as sidelink messaging, sidelink relay, relay communications, or device to device ("D2D") communication/messaging. FIG. 3*a* shows two-way sidelink communication between two UEs. UE1 transmits to UE2, and UE2 transmits to UE1. This example shows the UE may report/transmit/request information to another UE (i.e. UE2) or the information is requested/responsed by another UE (i.e. UE2).

Figure 3B:
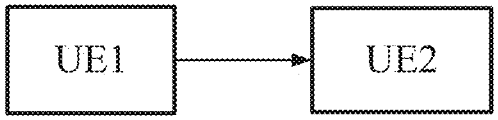
FIG. 3*b* shows another example sidelink communication.

FIG. 3*b* shows another example sidelink communication. FIG. 3*b* shows one-way sidelink communication between two UEs. In this example, the UE1 transmits/reports information to UE2. UE2 receives the transmitted information from UE1. In this example, the information may also be requested by UE2.

Figure 3C:
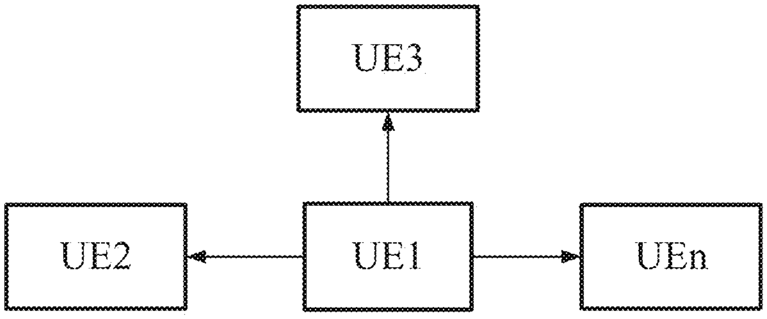
FIG. 3*c* shows another example sidelink communication.

FIG. 3*c* shows another example sidelink communication. FIG. 3*c* shows a UE (UE1) that broadcasts to multiple UEs. In this example, UE1 broadcasts/transmits information to n number of UEs (where n is an integer).

Figure 4A:
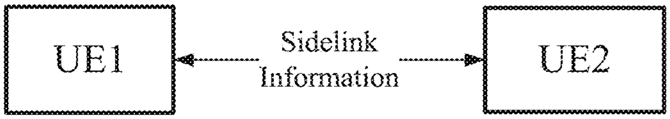
FIG. 4*a* shows an example sidelink communication with sidelink information.

FIG. 4*a* shows an example sidelink communication with sidelink information. FIG. 4*a* shows sidelink communications between UE1 and UE2 as in FIG. 3*a*. However, the transmission over sidelink in this example includes specific information, which is referred to as sidelink information and further described below. The sidelink communications may further include a send, a receive, a broadcast, a unicast, a request, a response, a forward, a exchange or a groupcast.

Figure 4B:
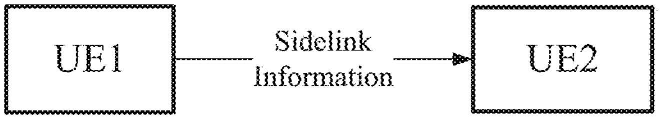
FIG. 4*b* shows another example sidelink communication with sidelink information.

FIG. 4*b* shows another example sidelink communication with sidelink information. FIG. 4*b* shows sidelink communications between UE1 and UE2 as in FIG. 3*b*, where UE1 transmits/reports information to UE2, and UE2 receives the transmitted information from UE1. In this example, the UE1 transmits/reports information to UE2. However, the transmission over sidelink in this example includes specific information, which is referred to as sidelink information and further described below.

Figure 4C:
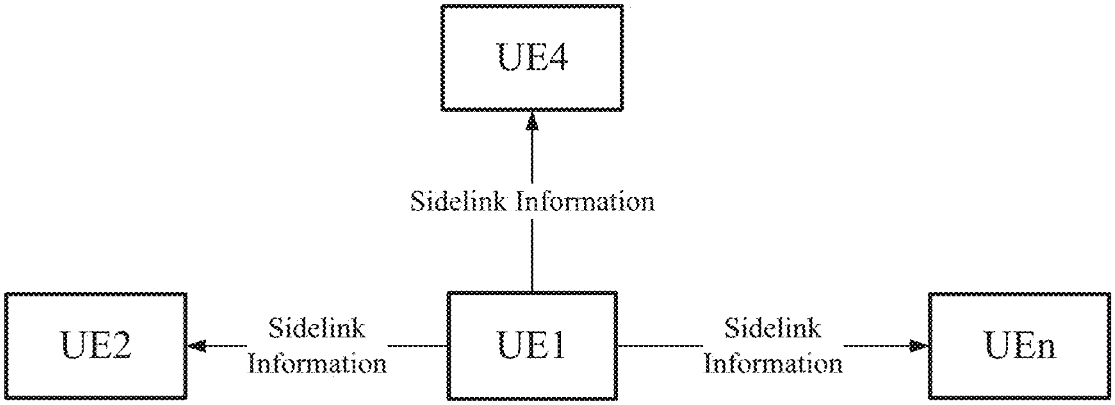
FIG. 4*c* shows another example sidelink communication with sidelink information.

FIG. 4*c* shows another example sidelink communication with sidelink information. FIG. 4*c* shows sidelink communications that are broadcast by UE1 to n number of UEs as in FIG. 3*c*. However, the transmission over sidelink in this example includes specific information, which is referred to as sidelink information and further described below. The UEs report/transmit information or capability may include a broadcast, groupcast (when HARQ-ACK information includes ACK or NACK), unicast, or a groupcast (when HARQ-ACK information includes only).

Sidelink Information

The sidelink information that is transmitted in FIGS. 4*a*-4*c* may include UE specific information. The UE information may include a UE identification (UEID), positioning information, location information, measurement results, a UE capability, the UE's information within its coverage, response time, response period, or measured Reference Signal Received Power (RSRP).

The sidelink information that is transmitted in FIGS. 4*a*-4*c* may include UE capability information. The UE capability may be at least one of: a capability to communicate with a network, a capability to calculate its positioning information or location, a capability to exchange the signaling or interact signaling with a another UE, a capability to forward other UE's information, a capability to broadcast its information or its received information from other UEs, a capability in the coverage of the network, a capability to support a reference signal or aperiodic/semi-persistent reference signal, a Zone ID, or a positioning reference signal (PRS) configuration. In other examples, the UE capability or information may include a synchronization information, or a capability of supporting at least one of the following positioning methods: network-assisted GNSS methods, observed time difference of arrival (OTDOA) positioning, WLAN positioning, Bluetooth positioning, terrestrial beacon system (TBS) positioning, Enhanced Cell-ID (ECID), Multiple-Round Trip Time (Multi-RTT), angle of Departure (AoD), Time Difference Of Arrival (TDOA), Angle of Arrival (AoA), or a capability to broadcast the physical information or RRC parameter(s).

The sidelink information or the positioning information may include a sidelink positioning reference signal (SL-PRS) configuration. The SL-PRS configuration may be indicated in control signaling, in a control channel, in other channel(s), or in an Radio Resource Control (RRC) parameter. The control signaling may include sidelink control information (SCI), downlink control information (DCI), Medium Access Control Control Elements (MAC CE), Non Access Stratum (NAS), or system information blocks x (SIBx) where x is an integer. The control channel includes at least one of a physical sidelink control channel (PSCCH), a physical downlink control channel (PDCCH), or a physical uplink control channel (PUCCH). The other channel(s) include at least one of a physical sidelink shared channel (PSSCH), a physical downlink shared channel (PDSCH), a physical uplink shared channel (PUSCH), a Physical Broadcast Channel (PBCH), a Physical Sidelink Feedback Channel (PSFCH), or a Physical Sidelink Broadcast Channel (PSBCH).

The capability further includes a capability to send sidelink information to a certain communication device, a capability to receive sidelink information from a certain communication device, a capability to exchange the signaling or interact signaling with a certain communication device, a capability to forward sidelink information about a certain communication device, a capability of receiving sidelink information from a certain communication device, or a capability of coverage of the network. In other examples, the UE capability includes a capability of supporting positioning function, a capability of communicating a positioning reference signal (PRS), a capability of supporting positioning method measurement, a capability to support aperiodic or semi-persistent PRS, a capability of communicating the control information, a capability of supporting multi-RTT method, or a capability of supporting multi-RTT measurement capability.

In other embodiments, the sidelink information includes at least one of: user equipment identification (UEID), positioning information, location information, measurement results, a UE capability, UE's information within its coverage, a zone ID, a response time, a response period, a sidelink positioning reference signal (SL-PRS) configuration, a synchronization information, a Rx-Tx time difference, number of Rx-Tx time difference, a reference signal timing difference (RSTD), a relative time of arrival (RTOA), a time stamp, a PRS resource ID, a PRS resource set ID, a beam information, angle information, a information of a positioning method, a information of control information, a configuration of positioning reference signal, a angle indication granularity, a configuration of measurement gap, resources capability for each positioning method, a PRS processing capability, a multi-round trip time (Multi-RTT) measurement capability, a UE PRS quasi co-location (QCL) processing capability, TDOA provide capabilities, AoD provide capabilities, Multi-RTT provide capabilities, a capability of additional Paths Report, a capability of periodical reporting, the maximum number of UE Rx-Tx time difference measurements corresponding to a PRS resource/resource set with each measurement, whether the communication device supports RSRP measurement for Multi-RTT in FRx, a granularity for the communication device Rx-Tx time difference measurements, a RSRP or the difference of RSRP to the reference communication device from other assistant communication device(s) of a communication device, a UE measurement capability, Multi-RTT measurements, a list of communication device or a angle indication manner, where FRx refers to at least one of: FR1, FR2, FR2-1, or FR2-2.

Sidelink Communication with the Network

The sidelink communications between UEs may also include the network, such as the basestation (also referred to as NG-RAN). The network may further include a core network, a Transmission/Reception Point (TRP), or a Location Management Function (LMF). The UE may communicate through any of the mechanisms described above with respect to FIGS. 3*a*-4*c* except the network can receive the information.

Figure 5A:
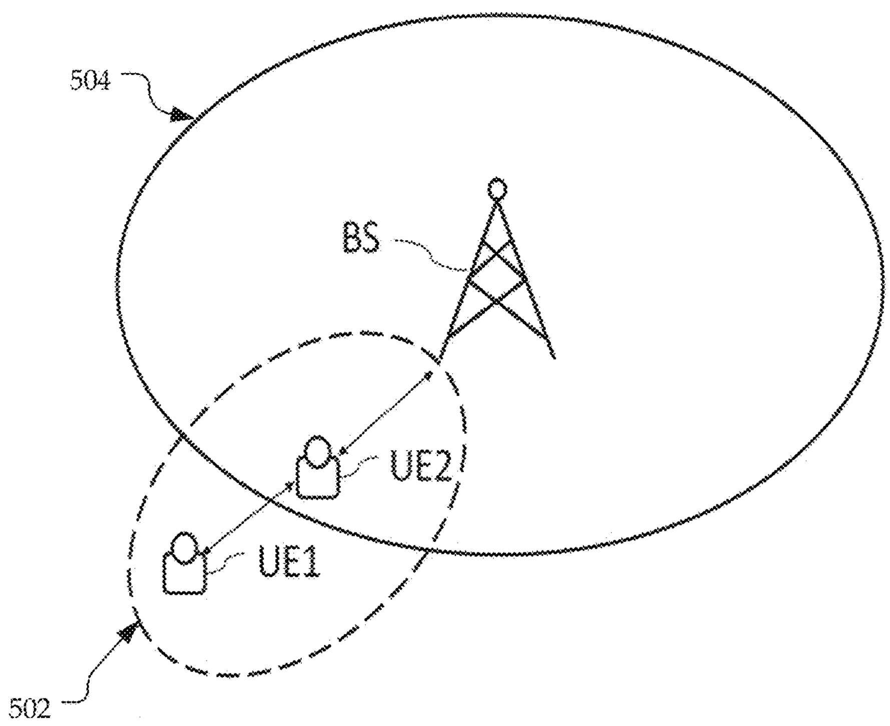
FIG. 5*a* shows an example with device to device messaging environment.

FIG. 5*a* shows an example with sidelink messaging environment. Specifically, FIG. 5*a* illustrates a basestation ("BS") with a communication range 504. A second user equipment ("UE2") is within the range of the BS's communication range 504, while a first user equipment ("UE1") is out of the range of the communication range 504. The UE1 and UE2 establish relay communications 502 through which UE2 is the relay UE and UE1 is the remote UE. For relay communications, a remote UE (UE1) communicates with the network through a relay UE (UE2). The relay UE (UE2) relays communications between the basestation (BS) and the remote UE (UE1). In some embodiments, relay communications may be designed for UE1 in an area with weak or no coverage. UE1 is allowed to communicate with the basestation BS through a relay UE (UE2). As a result, the coverage of the network 504 is extended out to include the relay communication coverage area 502 (including UE1) and the capacity of the network is enlarged.

In some embodiments, such as during emergency situations (e.g. earthquake), the cellular network may operate abnormally or a sidelink communication range of the network may need to be extended. Thus, the relay communications may be designed for allowing multiple UEs to communicate with each other via the relay UE. Although not shown, there may be multiple UEs in a relay communication chain, or a relay UE may have multiple remote UEs. The interface in FIG. 5*a* between the UE and BS during relay communications is referred to as the Uu interface.

Figure 5B:
FIG. 5*b* shows another example of sidelink communications.

FIG. 5*b* shows another example of sidelink communications. Compared with FIG. 4*b*, the UE2 can further communicate with the network (e.g. through a basestation). In some embodiments, the sidelink communications may be between user equipment (UE), a network node, a basestation, a local sever, a Transmission/Reception Point (TRP), or a Location Management Function (LMF). Although not shown in FIG. 5*b*, UE2 can receive information from another UE (UE1) that is then communicated to the network/basestation.

Figure 6:
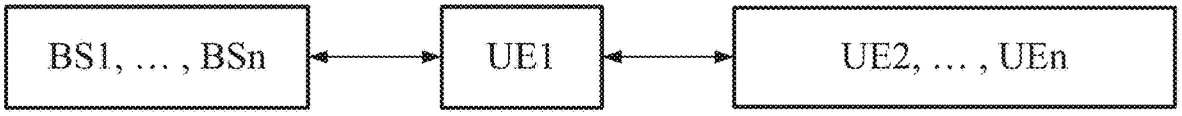
FIG. 6 shows an example of round-trip time (RTT) communications with sidelink.

FIG. 6 shows an example of round trip time (RTT) communications with sidelink. The example shows a UE (UE1) that communicates with multiple network nodes (i.e. basestations 1-n) and multiple other UEs (i.e. UE 2-n). This communication may be sidelink communications and may include sidelink information described above. The communications with multiple nodes/UEs can be used to measure and calculate a position. The sidelink information or the positioning information may include a positioning of multiple round trip time (multi-RTT), a positioning signal related to a positioning of multiple round trip time (multi-RTT), a communication device list, a Rx-Tx time difference of a communication device, a Rx-Tx time difference, a Rx-Tx time difference measurement, or a parameter or parameter list used by one communication device to provide Multi-RTT measurements to another communication device. A parameter may be used to provide assistance data to enable communication device assistance for the multi-RTT, or to provide location measurements for the multi-RTT. The location measurements are used to determine potential errors or are provided as a list of communication devices. The communication device indicates its capability to support Multi-RTT and to provide its Multi-RTT positioning capabilities to another communication device.

The UE may configure the PRS resource or a resource set by another UE. The UE may configure a UE list/group for positioning, or the UE may be configured by the UE list/group. A UE can broadcast/transmit/report a UE-Rx-Tx time difference measurement from another UE. A UE can receive a UE-Rx-Tx time difference measurements from another UE. A UE can receive an additional path list from another UE that refers to one or more additional detected path timing values for another UE or resource, relative to the path timing used for determining the UE-Rx-Tx time difference measurement. A UE may be sent that signal/signal type used for transmitting/transferring/measurement to another UE. The signal may refer to PRS, SSB, CSI-RS, while the signal type may refer to the type of PRS, SSB, CSI-RS.

A UE is sent, requested, or responded to information to or by another UE. The information may be the sidelink information and/or may include a resource Pool index, resource ID, resource set ID, resource set ID, RS for positioning is scrambled by a UE ID, frequency layer index, Time Stamp, a capability of measuring/reporting the measurement result(s) of the different band/frequency center, FR1, FR2-1, FR2-2, a best estimate of the quality of the measurement; a UE indicating its capability (Multi-RTT RS Capability, Multi-RTT Measurement Capability, RS QCL Processing Capability, RS Capability, additional Paths Report, periodical Reporting), angle of Departure or angle of arrival, max supported bandwidth, power saving requirement or positioning accuracy requirements. The information may be indicated by a SCI.

The communication device may configure the PRS resource or a resource set by another communication device. The communication device may configure a communication device list/group for positioning, or the communication device may be configured by the communication device list/group. A communication device can broadcast/transmit/report a Rx-Tx time difference measurement from another communication device. A communication device can receive a Rx-Tx time difference measurements from another communication device. A communication device can receive an additional path list from another communication device that refers to one or more additional detected path timing values for another communication device or resource, relative to the path timing used for determining the Rx-Tx time difference measurement. A communication device may be sent that signal/signal type used for transmitting/transferring/measurement to another communication device. The signal may refer to PRS, SSB, CSI-RS, while the signal type may refer to the type of PRS, SSB, CSI-RS.

A communication device may be requested by another communication device to report the RS Resource ID(s) or RS Resource Set ID(s) associated with the RS Resources(s) or the RS Resource Set(s) which are used in determining the communication device Rx-Tx time difference measurements. A communication device may request of another communication device that the recommended reporting granularity for the communication device Rx-Tx time difference measurements. The communication device may report the resource ID, resource set ID, or node ID of other assistant node(s) of this communication device. A communication device may report the measurement results (Rx-Tx time difference measurement), and the RSRP or the difference of RSRP to the reference node from other assistant node(s) of this communication device. The communication device may be configured with a maximum number of communication devices, and Rx-Tx time difference measurements for different resources or resource sets per communication device.

In some embodiments, a parameter is used by the node to provide assistance data to enable communication device assisted Multi-RTT. A parameter may be used by the communication device to request assistance data from another communication device. A parameter may be used by the communication device to provide NR Multi-RTT location measurements to another communication device, or it may used to provide Multi-RTT positioning specific error reason. A parameter may be used by the communication device to provide Multi-RTT measurements to another communication device. The measurements are provided as a list of communication device, where the first communication device in the list is used as reference communication device. A parameter may be used by a node to request Multi-RTT location measurements from the communication device. A parameter may be used by a communication device to indicate its capability to support Multi-RTT and to provide its Multi-RTT positioning capabilities to another communication device. A communication device can include its measurement capability as part of the communication device capability in the sidelink information. A parameter may be used by a first communication device to request the capability of the second communication device to support Multi-RTT and to request Multi-RTT positioning capabilities from a communication device.

Sidelink Positioning Reference Signal (PRS) and Priority

The PRS may be part of the sidelink information described above and may be referred to as a sideling PRS (SL-PRS). As described above, the sidelink information (or the positioning information, PRS configuration, or SL-PRS) configurations may include a SL-PRS period, a time resource of the SL-PRS, a frequency resource of the SL-PRS, a time gap between the SL-PRS and a sidelink channel, a minimum time gap between the SL-PRS and the sidelink channel, a SL-PRS hop ID, a comb size, a hop ID, a first symbol of the SL-PRS within a slot, a size of the SL-PRS resource in the time domain, a resource-element offset, a reference point, a location of a point A, a combination of the size of the SL-PRS resource in the time domain and the comb size, a SL-PRS sequence ID, a UE ID, a SL-PRS sequence set information, a SL-PRS frequency layer information, a PSFCH configuration, a CandidateResourceType, or a Physical Broadcast set. A unit of the SL-PRS period or a time resource of SL-PRS comprises at least one of a millisecond, a symbol, a set of symbols, a slot, or a set of slots. The SL-PRS period is configured within at least one of a bandwidth part (BWP), a carrier frequency, a configuration or a resource pool. The SL-PRS period is set to 0, which results in or means no resource for the SL-PRS. The SL-PRS period is a logical period. The SL-PRS period is associated with the PSFCH configuration. The SL-PRS configuration and the PSFCH configuration are configured in a resource pool.

The sidelink channel includes at least one of a physical sidelink shared channel (PSSCH), a physical sidelink shared channel (PSSCH), a Physical Sidelink Feedback Channel (PSFCH), or a Physical Sidelink Broadcast Channel (PSBCH). A unit of the frequency resource of SL-PRS comprises at least one of a Physical Resource block (PRB), a sub-channel, or a Resource element (RE). A size of the SL-PRS resource in the time domain comprise at least one of a number of symbol(s) per SL-PRS Resource, a number of symbol(s) a SL-PRS Resource, a number of symbol(s) per SL-PRS configuration, or a number of symbol(s) a SL-PRS configuration. The SL-PRS Resource or the SL-PRS configuration comprise at least one of a number of symbol(s) per SL-PRS Resource within a slot, a number of symbol(s) per SL-PRS configuration within a slot, a number of symbol(s) a SL-PRS Resource within a slot, or a number of symbol(s) a SL-PRS configuration within a slot. The reference point or the location of the point A comprises at least one of a positioning a frequency layer, a BWP, or a carrier frequency. The reference point or the location of the point A is a parameter provided by a high layer or SCI. The reference point or the location of the point A is associated with at least one of the lowest resource block (RB) index of a sidelink bandwidth part (SL BWP), a lowest RB index of the subchannel with a lowest index in the resource pool, a lowest RB index of a SL carrier frequency, a lowest subchannel index in the resource pool, the lowest subchannel index of a SL BWP, or a lowest subchannel index of a SL carrier frequency. The SL-PRS hop ID refers to a Scrambling ID for sequence hopping of the sidelink positioning reference signal (SL-PRS) configuration. The SL-PRS hop ID is used for a resource pool, a BWP, or a carrier frequency. The combination of the size of the SL-PRS resource in the time domain and the comb size is at least one of {2, 2}, {4, 2}, {6, 2}, {12, 2}, {4, 4}, {12, 4}, {6, 6}, {12, 6}, and {12, 12}. A value of the SL-PRS sequence ID is associated with a value of a user equipment identification (UEID). The SL-PRS sequence ID is used to initialize a value in a pseudo random generator for generation of the SL-PRS sequence for transmission on a SL-PRS Resource. The sidelink information, the positioning information, or a sidelink positioning reference signal (SL-PRS) configuration is configured by at least one of: a high layer parameter, a sidelink control information (SCI), or a NAS parameter. The communication device comprises a user equipment (UE), a network node, a basestation, a local sever, a Transmission/Reception Point (TRP) or a Location Management Function (LMF). The SL-PRS period(s) is associated with the time resource used in a sidelink resource pool, a BWP or a carrier frequency.

Figure 7:
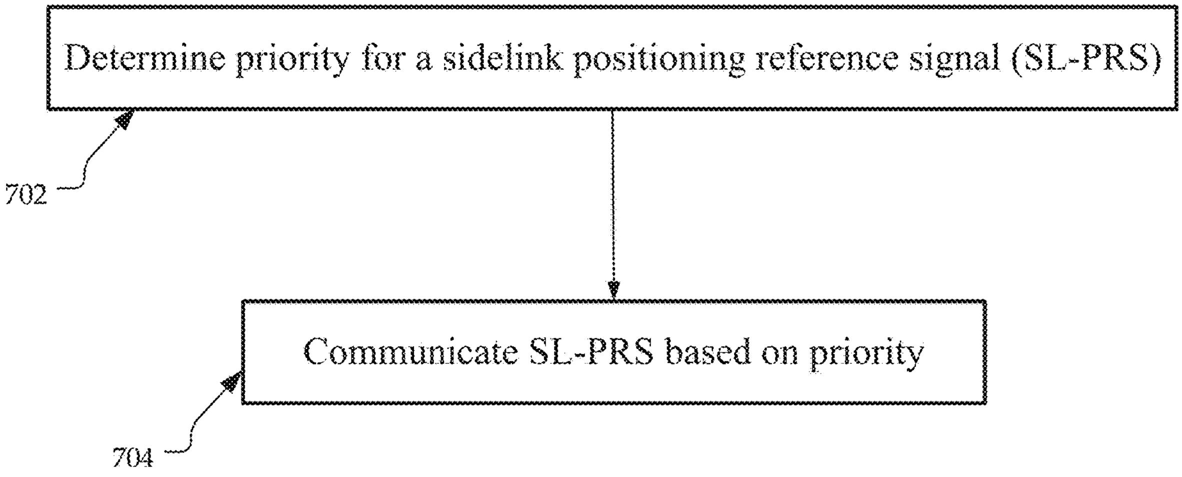
FIG. 7 shows an example with positioning reference signals in sidelink communications.

FIG. 7 shows an example with positioning reference signals (PRS) in sidelink communications. Specifically, the priority of PRS is considered for sidelink communications. In block 702, the priority for a sidelink positioning reference signal (SL-PRS) is determined. Based on the determined priority, the SL-PRS is communicated in block 704. The communication in block 704 includes sidelink communication and the different embodiments in which priority is considered for influencing the sidelink communication are discussed below.

The determining a priority in block 702 for the sidelink positioning reference signal (SL-PRS) may be based on at least one of a configuration, a default, a scenario, or an indication. The determining establishes that the SL-PRS has a highest priority, for which the communicating prioritizes the SL-PRS before communicating the other signal(s) or channel(s). The determining establishes that the SL-PRS has a lowest priority, for which the communicating prioritizes any other signal(s) or channel(s) before the SL-PRS. The determining a priority for the SL-PRS may be based on control signaling, which includes at least one of Radio Resource Control (RRC), Medium Access Control Element (MAC CE), downlink control information (DCI), Non Access Stratum (NAS), Sidelink Control Information (SCI), or system information blocks x (SIBx), where x is an integer.

The communicating in block 704 is from a first communication device to a second communication device. The first or second communication device comprises one of a user equipment (UE), a network node, a basestation, a local sever, a Transmission/Reception Point (TRP) or a Location Management Function (LMF). The communicating further comprises at least one of sending, receiving, broadcasting, unicasting, groupcasting, forwarding, requesting, responding, or exchanging.

When the PRS partially or fully overlaps with another signal (e.g. data, control, feedback, or other signals), a priority determination may be used for determinizing which signal should be transmitted. In one embodiment, a PRS has the higher priority than other signals by default. The priority may be given a number value (e.g. 1 is highest and 8 is lowest) in which case, the PRS priority may be a 1 in this embodiment. The priority may be specific to sidelink communications. The PRS resource/configuration may sense and select, or the PRS resource/configuration and sidelink data resource/configuration may sense and select, respectively. In other embodiments, only sidelink data resource/configuration may sense and select. The PRS may use the value of T2 min which is used in a selection window and X % which is transmit (Tx) slot/resource/time percentage based on the highest data priority.

In an alternative embodiment, PRS may have the lowest priority compared with other signals by default. In this example, the PRS priority may have a sidelink priority equal to 8 (which is the lowest data priority). The priority may be specific to sidelink communications. The PRS resource/configuration may sense and select, or the PRS resource/configuration and sidelink data resource/configuration may sense and select, respectively. In other embodiments, only sidelink data resource/configuration may sense and select. The PRS may use the value of T2 min which is used in a selection window and X % which is transmit (Tx) slot/resource/time percentage based on the lowest data priority.

In an alternative embodiment, PRS priority may be configured. The configuration may be based on a data priority level. In one example, the priority of PRS may be configured by control signaling, such as RRC, MAC CE, DCI, or SCI. In this example, the PRS priority value may be configured using any one of the following: 1, 2, 3, 4, 5, 6, 7, 8. The indication of the PRS priority may be configured using one of the following: 1, 0. The priority may be a decimal, the A is a priority of a decimal, B is an integer part, C is a fractional part, where A, B, and C are integers. The priority may be a decimal with the fractional part represented by 0 or 1. In some embodiments, there may be only one or more position(s) behind the decimal point. Alternatively, 1 indicates that the priority of PRS is higher/lower than a data priority, while 0 indicates that the priority of PRS is lower/higher than a data priority. The data priority may be indicated in SCI. The PRS resource/configuration may sense and select, or the PRS resource/configuration and sidelink data resource/configuration may sense and select, respectively. In other embodiments, only sidelink data resource/configuration may sense and select. If the priority of PRS (which priority value is Z) is higher than a data priority (which priority value is Y, where Y is one of the following: 1, 2, 3, 4, 5, 6, 7, 8.), the priority value of PRS may use $1<=Z<=Y$, or, equals to 1 by default. Alternatively, if the priority of PRS (which priority value is Z) is lower than a data priority (which priority value is Y, where Y is one of the following: 1, 2, 3, 4, 5, 6, 7, 8), then the priority of PRS may use $1>=Z>=Y$, or equals to 8 by default. The higher the priority, the lower the priority value. Priority value 8 is the lowest priority, while priority value 1 is the highest priority in one embodiment.

A priority for the SL-PRS is configured by at least one of a high layer parameter, a parameter in Radio Resource Control (RRC), a parameter in sidelink control information (SCI), a parameter in downlink control information (DCI), a parameter in Medium Access Control Elements (MAC CE), a Non Access Stratum (NAS) layer parameter, or a parameter in system information blocks x (SIBx) where x is an integer. The SL-PRS is used for calculating a location. The determined priority for the SL-PRS comprises at least one of the priority for the SL-PRS is higher than a first set of other signal(s) or channel(s), or the priority for the SL-PRS lower than a second set of the other signal(s) or channel(s). The communicating deprioritizes the SL-PRS and communicates the SL-PRS after the second set of the other signal(s) or channel(s). The communicating prioritizes the SL-PRS and communicates the SL-PRS before communicating the first set of the other signal(s) or channel(s). The first set of other signals has no intersection with the second set of other signal(s) or channel(s).

The priority may depend on other factors or scenarios. For example, there may be different cases for the positioning of the sidelink to be considered urgent, not urgent, high delay, or low delay. The PRS may have a higher priority than at least one of a physical sidelink Control channel (PSCCH), a physical sidelink shared channel (PSSCH), a Physical Sidelink Feedback Channel (PSFCH), a Channel-state information reference signal (CSI-RS), or a Physical Sidelink Broadcast Channel (PSBCH). In another example, the PRS may have a lower priority than at least one of a physical sidelink Control channel (PSCCH), a physical sidelink shared channel (PSSCH), a Physical Sidelink Feedback Channel (PSFCH), a Channel-state information reference signal (CSI-RS), or a Physical Sidelink Broadcast Channel (PSBCH). Finally, the PRS may be higher than part of and lower than part of a physical sidelink Control channel (PSCCH), a physical sidelink shared channel (PSSCH), a Physical Sidelink Feedback Channel (PSFCH), a Channel-state information reference signal (CSI-RS), or a Physical Sidelink Broadcast Channel (PSBCH). The network may configure an option to include any of these examples for the positioning or for PRS resource/configuration or PRS measurements in certain situations. At least one of these examples for the positioning are supported subject to the UE capability and depending on PRS resource/configuration or PRS measurement.

Non-Zero Power PRS/Zero Power PRS

The sidelink communication may include a non-zero power positioning reference signal (PRS) or a zero power PRS. Through the sidelink communication, there may be the configuring of a non-zero power positioning reference signal (PRS) configuration or a zero power PRS configuration.

Figure 8A:
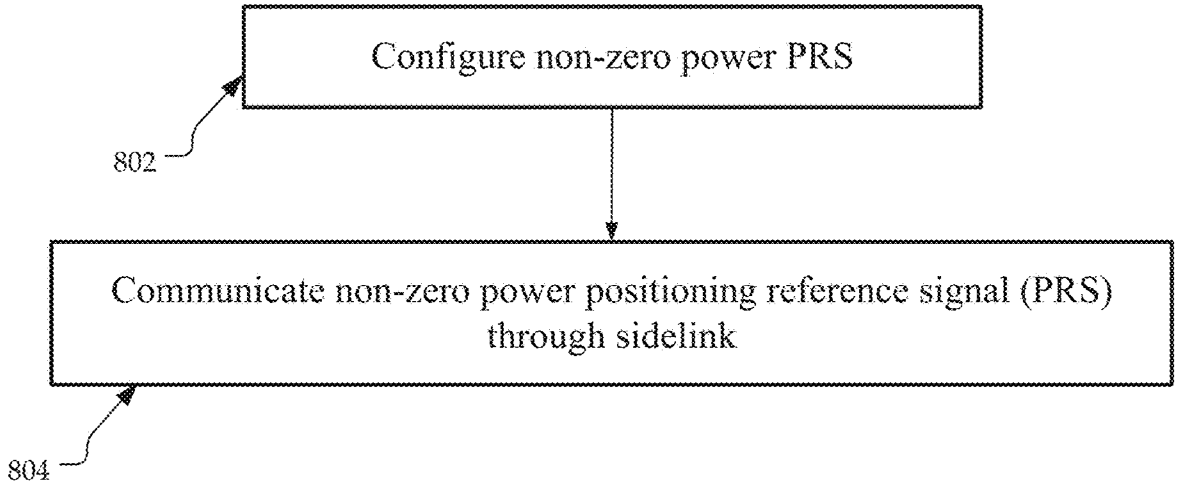
FIG. 8*a* shows an example of non-zero power positioning reference signals (PRS) configuration in sidelink communications.

FIG. 8*a* shows an example of non-zero power positioning reference signals (PRS) configuration in sidelink communications. The non-zero power PRS may be configured in block 802. The sidelink communication may include a non-zero power positioning reference signal (PRS) in block 804. In some embodiments, block 802 and block 804 may be independent from one another or performed in a different order. The non-zero power PRS may be periodic, semi-persistent, or aperiodic. The non-zero power PRS may use rate matching or a priority of SL-PRS as discussed herein. A time or the frequency resource of the non-zero power positioning reference signal (PRS) may be configured by a control signaling as further described below with respect to FIG. 8*d*.

Figure 8B:
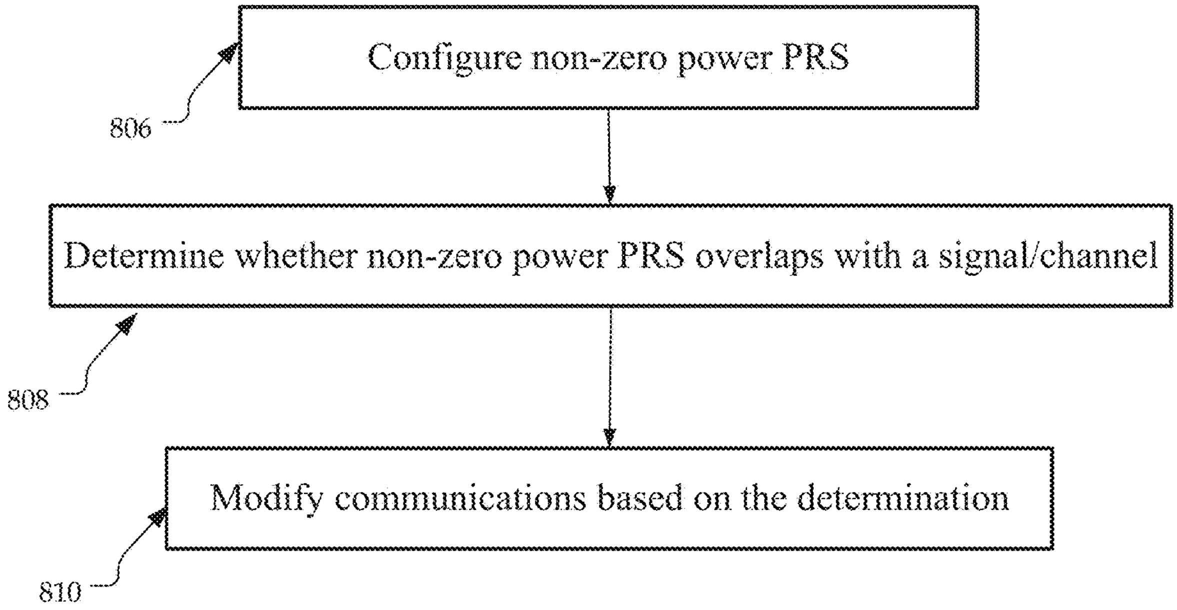
FIG. 8*b* shows an example with overlap of non-zero power positioning reference signals (PRS) configuration in sidelink communications.

FIG. 8*b* shows an example with overlap of non-zero power positioning reference signals (PRS) configuration in sidelink communications. In block, 806, the non-zero power PRS may be configured as in block 802. In block 808, there may be a determination as to whether the non-zero power PRS overlaps with any other signal(s) or channel(s). Based on the determination, the communications (i.e. sidelink communications) may be modified in block 810. In one embodiment, the modifying includes not transmitting the non-zero power PRS when there is overlap or partially overlap. In another embodiment, the modifying includes a partial transmission when the determination is that the non-zero power PRS at least partially overlaps. The overlap is further described with respect to FIGS. 10*a*-10*f*.

Figure 8C:
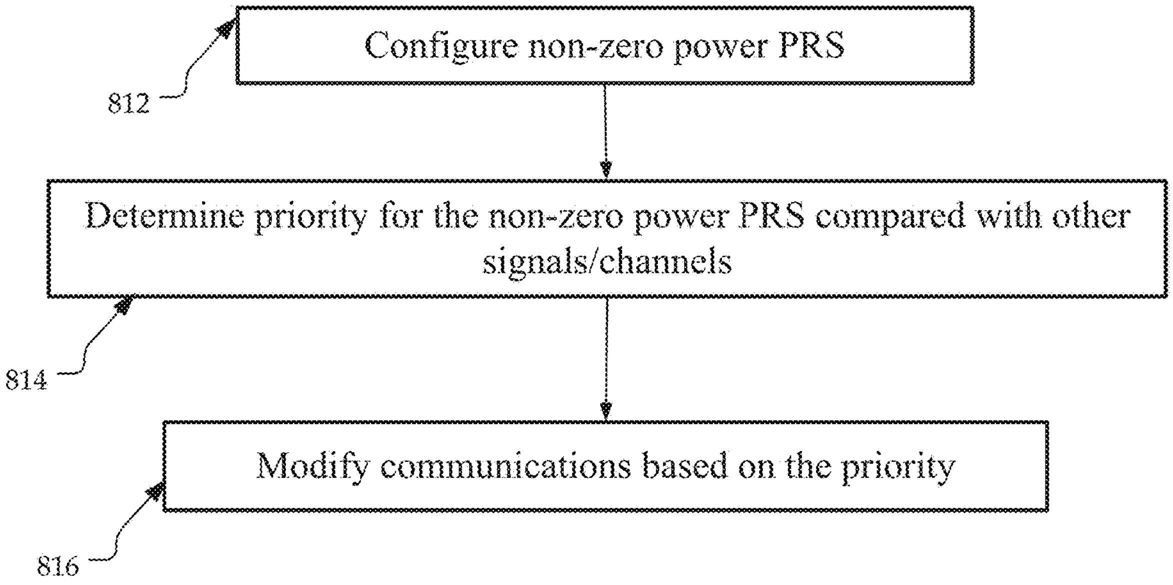
FIG. 8*c* shows an example with priority of non-zero power positioning reference signals (PRS) configuration in sidelink communications.

FIG. 8*c* shows an example with priority of non-zero power positioning reference signals (PRS) configuration in sidelink communications. In block, 812, the non-zero power PRS may be configured as in blocks 802, 806. In block 814, there may be a determination as to the priority of the non-zero power PRS compared with other signal(s) or channel(s). Based on the priority determination, the communications (i.e. sidelink communications) may be modified in block 816. In one embodiment, the modifying includes not transmitting the non-zero power PRS when the non-zero power PRS priority is lower than the other signal(s) or channel(s). In another embodiment, the modifying includes a partial transmission when the determination is that the priority of the non-zero power PRS is higher than one or more signal(s) or channel(s) and is lower than one or more signal(s) or channel(s).

Figure 8D:
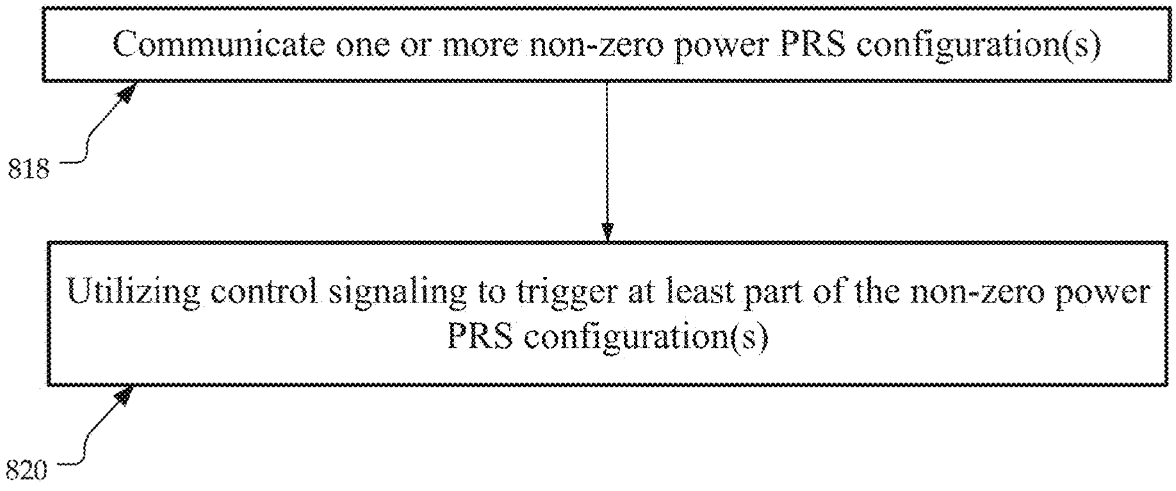
FIG. 8*d* shows an example with triggering of non-zero power positioning reference signals (PRS) configuration in sidelink communications.

FIG. 8*d* shows an example with triggering of non-zero power positioning reference signals (PRS) configuration in sidelink communications. In block 818, the non-zero power PRS configuration(s) is communicated. In block 820, control signaling may be utilized to trigger at least part of the non-zero power PRS configuration(s). In one example, a time or the frequency resource of the non-zero power positioning reference signal (PRS) may be configured by and/or triggered by control signaling.

Figure 9A:
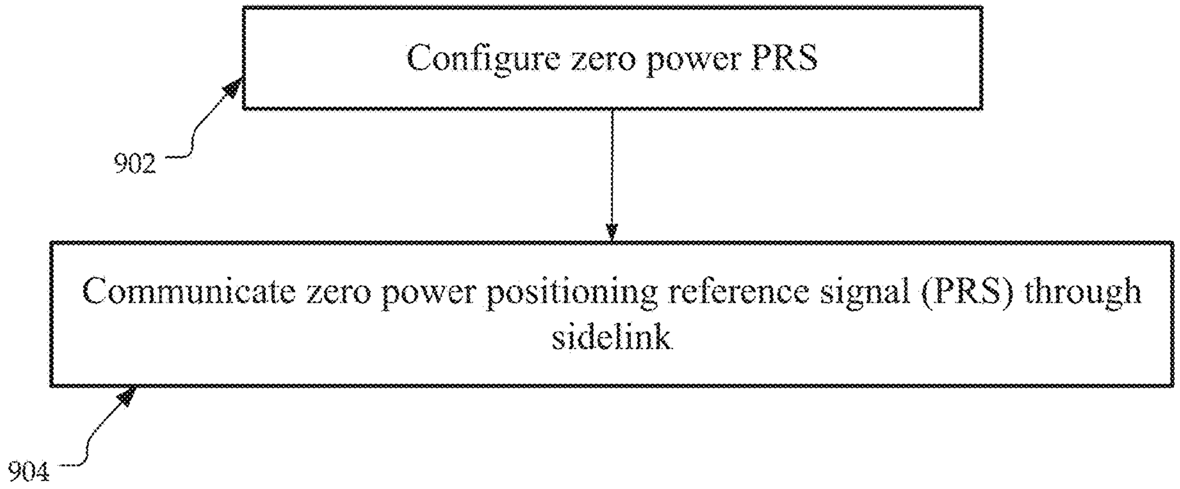
FIG. 9*a* shows an example of zero power positioning reference signals (PRS) configuration in sidelink communications.

FIG. 9*a* shows an example of zero power positioning reference signals (PRS) configuration in sidelink communications. The zero power PRS may be configured in block 902. The sidelink communication may include a zero power positioning reference signal (PRS) in block 904. In some embodiments, block 902 and block 904 may be independent from one another or performed in a different order. The zero power PRS may be periodic, semi-persistent, or aperiodic. The zero power PRS may use rate matching or a priority of SL-PRS as discussed herein. A time or the frequency resource of the zero power positioning reference signal (PRS) may be configured by a control signaling as further described below with respect to FIG. 9*d*.

Figure 9B:
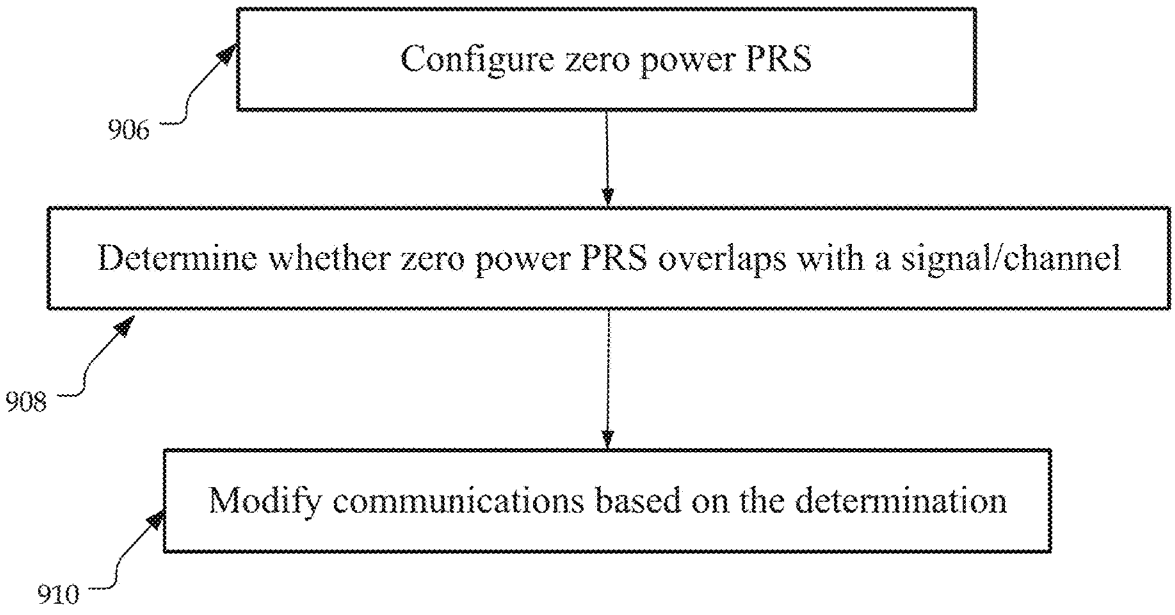
FIG. 9*b* shows an example with overlap of zero power positioning reference signals (PRS) configuration in sidelink communications.

FIG. 9*b* shows an example with overlap of zero power positioning reference signals (PRS) configuration in sidelink communications. In block, 906, the zero power PRS may be configured as in block 902. In block 908, there may be a determination as to whether the zero power PRS overlaps with any other signal(s) or channel(s). Based on the determination, the communications (i.e. sidelink communications) may be modified in block 910. In one embodiment, the modifying includes not transmitting the zero power PRS when there is overlap or partially overlap. In another embodiment, the modifying includes a partial transmission when the determination is that the zero power PRS at least partially overlaps. The overlap is further described with respect to FIGS. 10*a*-10*f*.

Figure 9C:
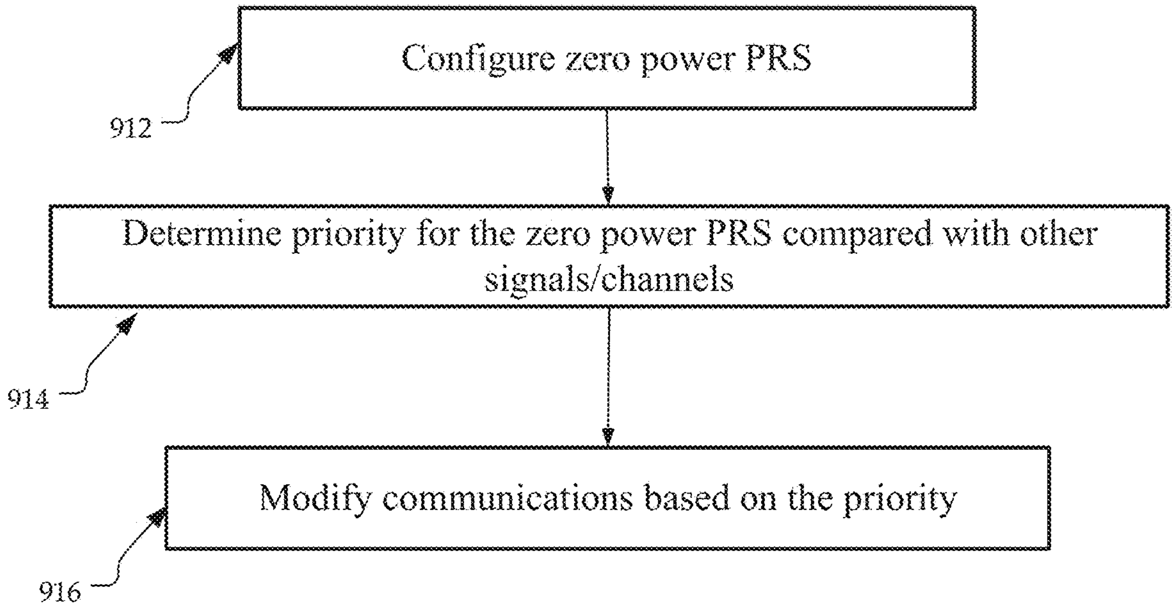
FIG. 9*c* shows an example with priority of zero power positioning reference signals (PRS) configuration in sidelink communications.

FIG. 9*c* shows an example with priority of zero power positioning reference signals (PRS) configuration in sidelink communications. In block, 912, the zero power PRS may be configured as in blocks 902, 906. In block 914, there may be a determination as to the priority of the zero power PRS compared with other signal(s) or channel(s). Based on the priority determination, the communications (i.e. sidelink communications) may be modified in block 916. In one embodiment, the modifying includes not transmitting the zero power PRS when the zero power PRS priority is lower than the other signal(s) or channel(s). In another embodiment, the modifying includes a partial transmission when the determination is that the priority of the zero power PRS is higher than one or more signal(s) or channel(s) and is lower than one or more signal(s) or channel(s).

Figure 9D:
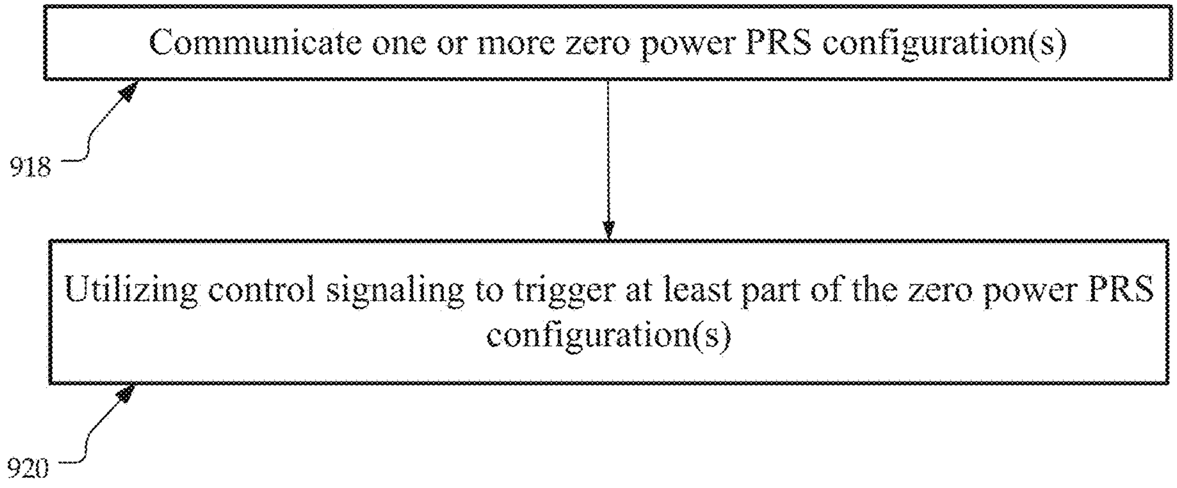
FIG. 9*d* shows an example with triggering of zero power positioning reference signals (PRS) configuration in sidelink communications.

FIG. 9*d* shows an example with triggering of zero power positioning reference signals (PRS) configuration in sidelink communications. In block 918, the zero power PRS configuration(s) is communicated. In block 920, control signaling may be utilized to trigger at least part of the zero power PRS configuration(s). In one example, a time or the frequency resource of the zero power positioning reference signal (PRS) may be configured by and/or triggered by control signaling.

In one embodiment, if a UE is not configured with at least one high-layer parameter which is related in PRS or the PRS in sidelink, then the UE assumes PRS is not present. In some embodiments, there may be both a non-zero power PRS and aero power PRS that are supported. In other embodiments, only one may be supported. The non-zero power PRS and/or zero power PRS may be configured by a higher parameter(s).

For a periodic, semi-Persistent, or aperiodic non-zero power PRS configuration, there may be rate matching. The rate matching is performed with, the signal(s) or channel(s) comprises at least one of: a data signal, a control signal, a DeModulation Reference Signal (DM-RS), a feedback signal, a Demodulation reference signal (DM-RS), a Phase-tracking reference signal(s) (PT-RS), a Channel-state information reference signal (CSI-RS), a Primary synchronization signal (PSS), a Secondary synchronization signal (SSS), a Sounding reference signal (SRS), a Sidelink primary synchronization signal (S-PSS), a Sidelink secondary synchronization signal (S-SSS), a physical sidelink Control channel (PSCCH), a physical downlink Control channel (PDCCH), a physical uplink Control channel (PUCCH), a physical sidelink shared channel (PSSCH), a physical downlink shared channel (PDSCH), a physical uplink shared channel (PUSCH), a Physical Broadcast Channel (PBCH), a Physical Sidelink Feedback Channel (PSFCH), or a Physical Sidelink Broadcast Channel (PSBCH). The time or the frequency resource only for the zero power PRS communicating. The control signaling is included at least one of: sidelink control information (SCI), downlink control information (DCI), Medium Access Control Elements (MAC CE), Non Access Stratum (NAS) layer, or system information blocks x (SIBx), where x is an integer.

Alternatively, for a periodic, semi-persistent or aperiodic zero power positioning PRS configuration, there may be rate matching with at least one of the PSSCH, PSCCH, PSFCH. At least one of the PSSCH, PSCCH, PSFCH may not transmit in the located/configured PRS RE, PRS slot(s)/symbol(s), or PRS transmitted/configured unit in time domain. Alternatively, aperiodic non-zero power positioning PRS configuration, the UE/base station may choose not to rate matching with at least one of the PSSCH, PSCCH, or PSFCH. At least one of the PSSCH, PSCCH, or PSFCH can transmit in the located/configured PRS RE, PRS slot(s)/symbol(s), or PRS transmitted/configured unit in time domain simultaneous. Alternatively, non-zero power PRS may configure at least one of a power offset of PSSCH RE to non-zero power (NZP) Positioning-RS RE, Power offset of NZP Positioning-RS RE to SSS RE. Alternatively, the unit of the value of the power offset(s) is decibel (dB). Alternatively, the transmission timing of the PRS is configured by the high-layer parameter or by default.

For overlap of the PRS with other signal(s) or channel(s), there may be a default mechanism for determining what to do during the overlap. The overlap may be complete or there may be a partial overlap. The response to an overlap may be to stop transmission completely or to stop transmission of the overlapping part. In other embodiments, the PRS transmission may be sent by default despite the overlap or it may depend on whether the overlap is complete or partial. In one embodiment, PRS is not transmit in the overlapping part if it overlaps at least one of DM-RS, PSFCH, PSSCH, PSSCH, CSI-RS, PT-RS, or SSB. Alternatively, PRS is not transmitted when it overlaps at least one of DM-RS, PSFCH, PSSCH, PSSCH, CSI-RS, PT-RS, or SSB. The transmit unit may be symbol(s) or RE. Alternatively, at least one of DM-RS, PSFCH, PSSCH, PSSCH, CSI-RS, PT-RS, or SSB is not transmitted if it overlaps PRS. Alternatively, PRS is not transmitted in the overlapping part if it partially overlaps DM-RS, PSFCH, PSSCH, PSSCH, CSI-RS, PT-RS, or SSB. Alternatively, PRS is not transmitted when it partially overlaps at least one of DM-RS, PSFCH, PSSCH, PSSCH, CSI-RS, PT-RS, or SSB. Alternatively, at least one of DM-RS, PSFCH, PSSCH, PSSCH, CSI-RS, PT-RS, or SSB is not transmitted if it partially overlaps PRS. Alternatively, the UE is not expected to receive PRS when at least one of SSB, DMRS, PTRS, or CSI is on the same resource elements.

Figure 10A:
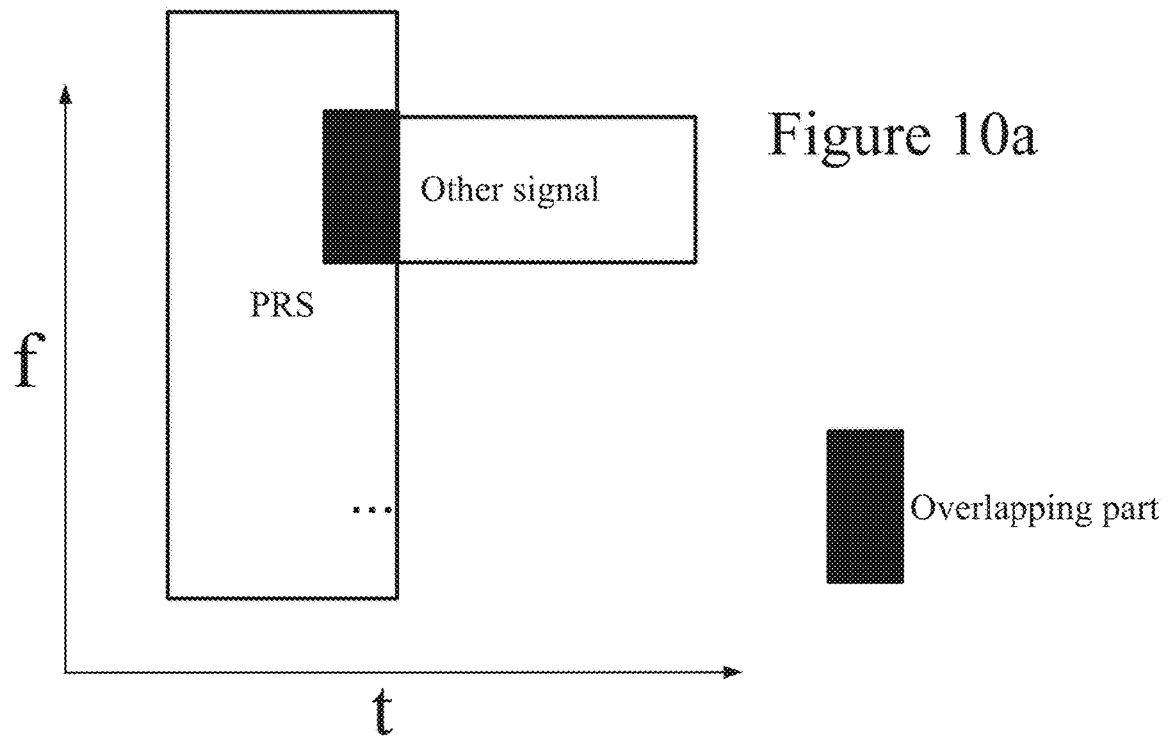
FIG. 10*a* shows an example of overlap of a positioning reference signal (PRS) in sidelink communications.

FIG. 10*a* shows an example of overlap of a positioning reference signal (PRS) in sidelink communications. The overlapping part of PRS is not transmitted in this example. It is used to transmit the other signals since the PRS bandwidth is larger than the other signal part. The start time of the PRS may be earlier than the other signal.

Figure 10B:
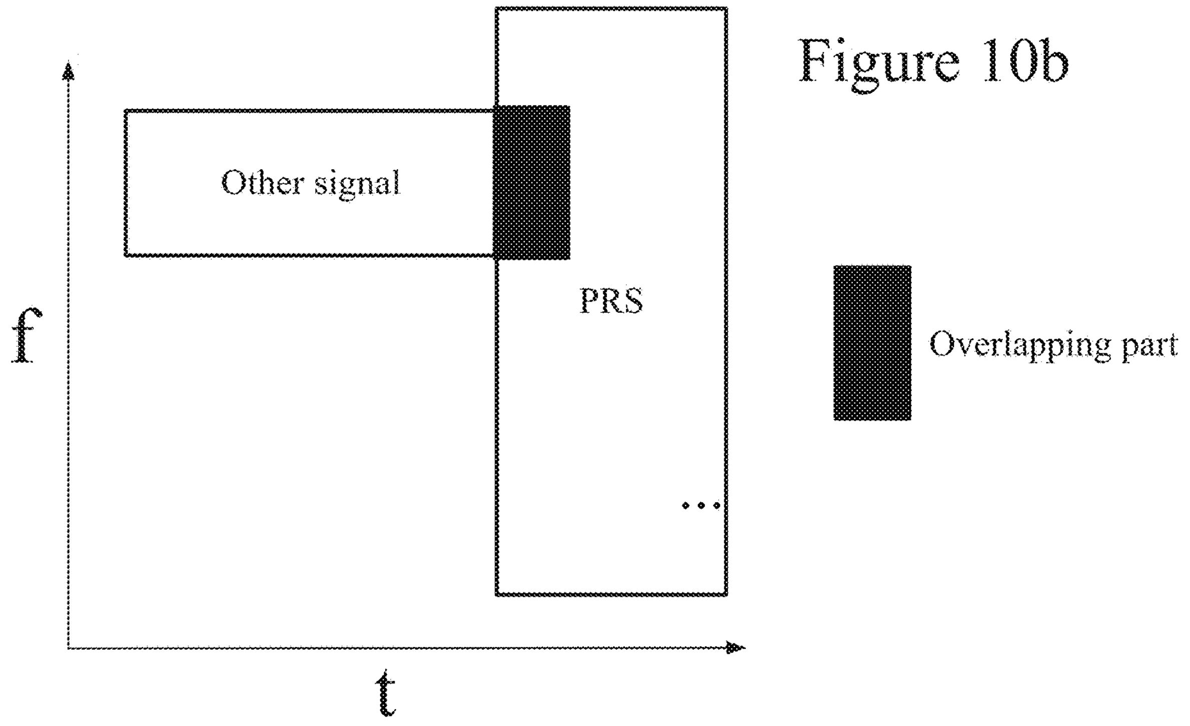
FIG. 10*b* shows another example of overlap of a positioning reference signal (PRS) in sidelink communications.

FIG. 10*b* shows another example of overlap of a positioning reference signal (PRS) in sidelink communications. The overlapping part of PRS is not transmitted. It may be used to transmit the other signals. The PRS bandwidth is larger than the other signal part. The start time of the other signal may be earlier than the PRS.

Figure 10C:
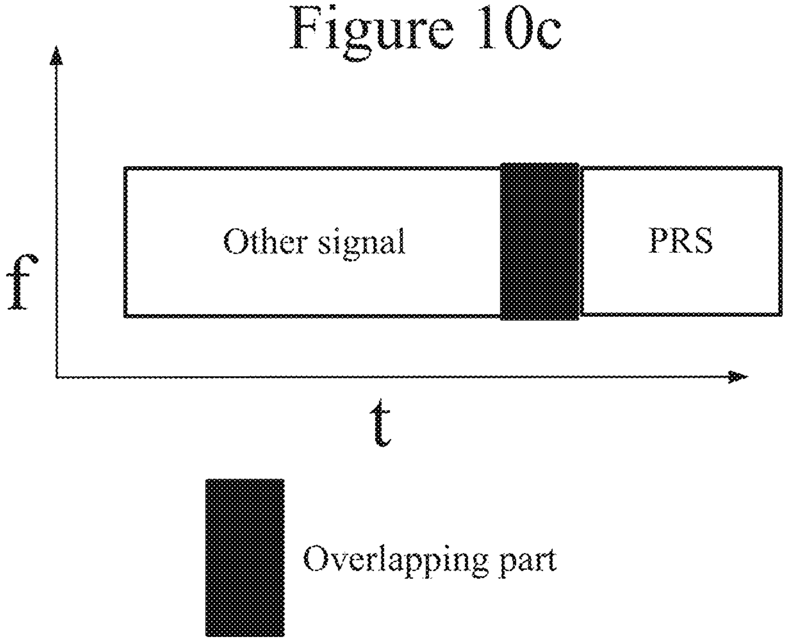
FIG. 10*c* shows another example of overlap of a positioning reference signal (PRS) in sidelink communications.

FIG. 10*c* shows another example of overlap of a positioning reference signal (PRS) in sidelink communications. The overlapping part of PRS is not transmitted. It may be used to transmit the other signals. The PRS bandwidth is the same as the other signal part. The start time of the other signal is earlier than the PRS.

Figure 10D:
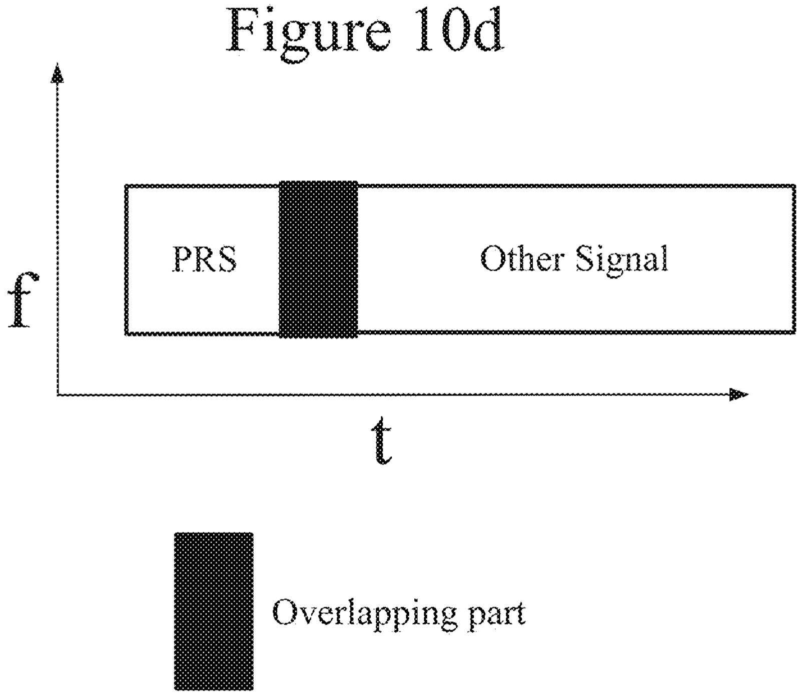
FIG. 10*d* shows another example of overlap of a positioning reference signal (PRS) in sidelink communications.
Figure 10E:
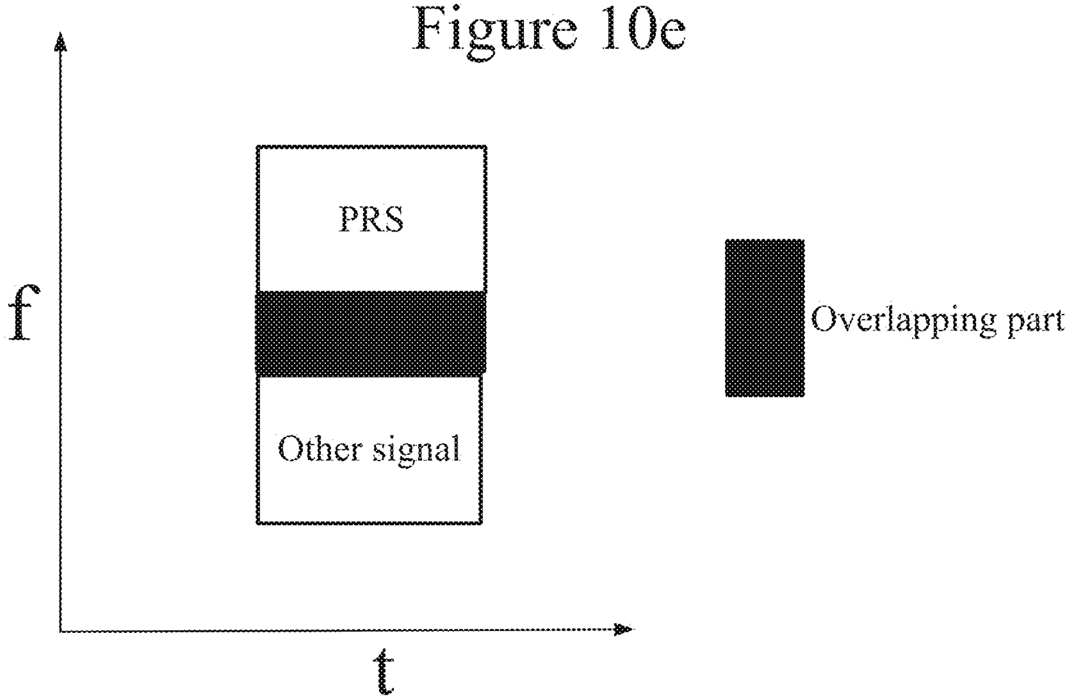
FIG. 10*e* shows another example of overlap of a positioning reference signal (PRS) in sidelink communications.

FIG. 10*d* shows another example of overlap of a positioning reference signal (PRS) in sidelink communications. The overlapping part of PRS is not transmitted. It may be used to transmit the other signals. The PRS bandwidth may be the same as the other signal part. The start time of the PRS may be earlier than the other signal FIG. 10*e* shows another example of overlap of a positioning reference signal (PRS) in sidelink communications. The overlapping part of PRS is not transmitted. It may be used to transmit the other signals. The PRS time domain may be the same as the other signal part. The start frequency part of the PRS may be higher than the other signal.

Figure 10F:
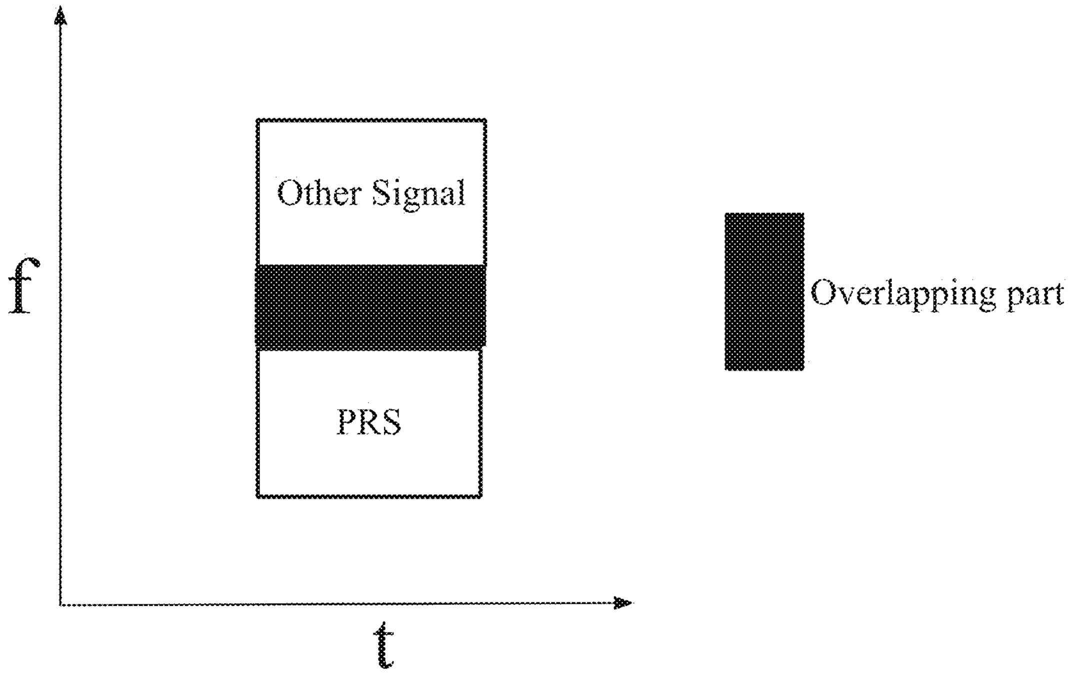
FIG. 10*f* shows another example of overlap of a positioning reference signal (PRS) in sidelink communications.

FIG. 10*f* shows another example of overlap of a positioning reference signal (PRS) in sidelink communications. The overlapping part of PRS is not transmitted. It may be used to transmit the other signals. The PRS time domain may be the same as the other signal part. The start frequency part of the PRS is lower than the other signal.

Mapping/Association in Sidelink

Figure 11:
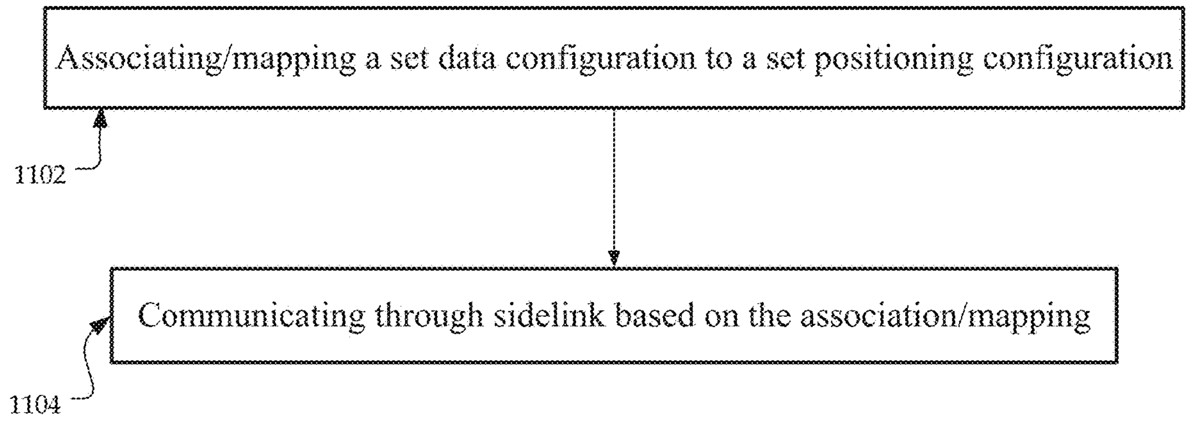
FIG. 11 shows an example of mapping configurations that are communicated in sidelink.

FIG. 11 shows an example of mapping configurations that are communicated in sidelink. In block 1102, the associating or mapping of a set data configuration(s) to a set positioning configuration(s). The mapping or associating includes a transmission, indication, sensing, or selecting of the set positioning configuration(s) based on the mapping or associating of the set data configuration(s). In block 1104, the communicating is through sidelink and based on the mapping or associating. The communicating includes sending, receiving, broadcasting, unicasting, groupcasting, forwarding, requesting, responding, or exchanging.

The set data configuration(s) or the set positioning configuration(s) is indicated or triggered by a parameter or a set of parameters such as sidelink control information (SCI) parameters, Radio Resource Control (RRC), downlink control information (DCI), Medium Access Control Elements (MAC CE), Non Access Stratum (NAS), high layer or system information blocks x (SIBx), where x is an integer. The set data configuration(s) is indicated or triggered by the parameter or the set of parameters. The parameter or the set of parameters is associated or mapped to the set of positioning configuration(s). The set data configuration(s) and the mapped or associated positioning configuration(s) is configured or triggered by one or more sidelink control information (SCI), the parameter(s), or the set(s) of parameters. The set positioning configuration(s) is indicated or triggered by the parameter(s) or the set of parameters. The parameter or the set of parameters is associated or mapped to the set of data configuration(s). The set positioning configuration(s) and the mapped or associated data configuration(s) is configured or triggered by one or more sidelink control information (SCI), the parameter(s), or the set(s) of parameters.

The parameter or the set of parameters are indicated by a sidelink positioning resource signal (SL-PRS) resource pool index, one or more PRS period(s), a PRS time resource, a PRS frequency resource, a PRS priority, a parameter of deactivation/activation, a time resource of the PRS, a frequency resource of the PRS, a time gap between the PRS and a sidelink channel, a minimum time gap between the PRS and a sidelink channel, a SL-PRS hop ID, a comb size, a hop ID, a first symbol of the PRS within a slot, a size of the SL-PRS resource in the time domain, a resource-element offset, a reference point, a location of the point A, a combination of the size of the PRS resource in the time domain and the comb size, a PRS sequence ID, a PRS sequence set information, a PRS frequency layer information, a resource ID/index, a carrier frequency ID/Index, a BWP ID/Index, a resource set ID/index, or a frequency layer ID/index. The PRS period(s) is associated with the resource reservation interval of the mapped or associated data resource pool. The PRS period(s) is in the unit of at least one of milliseconds (msec), or logical slot(s). The PRS period(s) is converted the from the unit of msec to the unit of logical slot(s). The set data configuration(s) is mapped or associated to P positioning configurations, where P is an integer >1. The P positioning configurations are bundled and one of the P PRS configurations is disabled or invalid, and the other P−1 PRS configuration(s) are disabled or invalid. When the data configuration(s) is not mapped or associated, the data configuration(s) is disabled or invalid.

The set data configuration(s) comprises one or more data configuration(s). The set positioning configuration(s) comprises one or more positioning configuration(s). The set of data or positioning configuration(s) comprises or in at least one of the following: a bandwidth part (BWP), a carrier frequency, a resource pool, or an occasion. The set of data configuration(s) may be configured in a bandwidth part (BWP), a carrier frequency, or a resource pool. The set of positioning configuration(s) may be configured in a bandwidth part (BWP), a carrier frequency, or a resource pool. The set of data configuration(s) may be configured in one or more bandwidth part (BWP), one or more carrier frequency, or one or more resource pool. The set of positioning configuration(s) may be configured in one or more bandwidth part (BWP), one or more carrier frequency, or one or more resource pool. The set data configuration(s) or the set positioning configuration(s) is pre-configured, configured by a radio resource control (RRC) configuration message, configured by a sidelink control information (SCI) parameter, configured by a downlink control information (DCI) parameter, configured by a Medium Access Control Elements (MAC CE) parameter, configured by a Non Access Stratum (NAS) parameter or configured by a system information blocks x (SIBx) parameter, where x is an integer.

The mapping or associating may be based on a ratio. In some embodiments, the mapping or the associating includes a mapping or associating ratio, the set data configuration(s), or the set positioning configuration(s). The mapping or associating ratio includes a ratio of the set data configuration (s) to the set positioning configuration(s), or a ratio of the set positioning configuration(s) to the set data configuration(s). A value of the mapping or associating ratio is at least one of 1:M, N:1, or M:N, where M and N are integers. In some embodiments, the mapping ratio may be 1:1, 1:2, 1:4, 2:1, 4:1, and/or 6:1. Alternatively, the mapping ratio may be configured by a high-layer parameter(s), control signaling, or by default.

In a first embodiment, M data resource/configuration is mapped to N position resource/configuration. Whether the mapped positioning resource/configuration can be transmitted with a data resource(s)/configuration(s) may depend on the sensing or selecting result of the data resource/configuration. In some embodiments, a UE may only do the sensing for the data resource/configuration, or alternatively, the UE will not do sensing for positioning resource/configuration or the PRS.

In a second embodiment, one data resource/configuration is mapped to N position resource/configuration. In some embodiments, only the UE may do the sensing for a data resource/configuration. In other embodiments, only the UE does the sensing for all positioning resource(s)/configuration(s). Whether the mapped positioning resource(s)/configuration(s) can be transmitted with a data resource may depend on the sensing or selecting result of the data resource/configuration. Alternatively, whether the mapped data resource/configuration can be transmitted with the positioning resource(s)/configuration(s) may depend on the sensing or selecting result of the data resource/configuration. If at least one of the N positioning resource(s)/configurations is occupied or invalid, the other N−1 positioning resource(s)/configurations may be unavailable. In some embodiments, N positioning resource(s)/configuration(s) may always be bundled. Alternatively, the validation of the positioning resource(s)/configurations per configuration, which validation of a data or positioning configuration is associated or related to another configuration. Alternatively, the positioning resource(s)/configurations is not associated or mapped is invalid. Alternatively, the positioning resource(s)/configurations is not associated or mapped is valid.

In a third embodiment, one sublink control information (SCI) resource/configuration in the sensing window reserves N PRS configurations/resources in the selection windows by default or by higher layer configuration or by control signaling. In some embodiments, the resource may be subchannel or resource pool. In some embodiments, a UE may only do the sensing for all positioning resource(s)/configuration(s). In some embodiments, one or more of N PRS configuration(s)/resource(s) may be scheduled by the SCI in the selection window. In some embodiments, if at least one of N PRS configurations is occupied, invalid or disabled, the other N−1 PRS configurations may be unavailable since there is no SCI resource. In some embodiments, N positioning/PRS resource(s)/configuration(s) may always be bundled.

In a fourth embodiment, N SCIs mapped to one PRS resource/configuration by higher layer signaling or by default. In some embodiments, PRS resource/configuration may do sensing and selection. Alternatively, at least one of the SCIs is sensed successfully, then the PRS resource/configuration will be transmitted without sensing. When at least one of the SCIs is sensed successfully, then the PRS resource/configuration will start sensing. If all of the SCIs are sensed successfully, then the PRS resource/configuration will be transmit without sensing. If all of the SCIs are sensed successfully, then the PRS resource/configuration will start sensing.

In a one embodiment, if X % of the SCIs are sensed successfully, then the PRS resource/configuration will be transmitted without sensing. Alternatively, if X % of the SCIs are sensed successfully, then the PRS resource/configuration will start sensing. In some embodiments, X is related the priority of date which is indicated by the SCI format. Alternatively, X is related the highest/lowest priority of date which is indicated by the SCI format.

In some embodiments, when the positioning configuration(s) is not mapped or associated, the positioning configuration(s) is disabled or invalid. The mapping or associating is configured by a communication device. The communication device comprises a user equipment (UE), a network node, a basestation, a local sever, a Transmission/Reception Point (TRP), or a Location Management Function (LMF). When the data or positioning configuration(s) is not mapped or associated, the communication device cannot communicate using the data or positioning configuration(s). When the data or positioning configuration(s) is not mapped or associated, the communication device cannot sense or select. For the parameter of deactivation/activation, a ‘1’ designates activation and a ‘0’ designates deactivation, or a ‘0’ designates activation and a ‘1’ designates deactivation. The sidelink channel comprises a physical sidelink shared channel (PSSCH), a physical sidelink shared channel (PSSCH), a Physical Sidelink Feedback Channel (PSFCH), or a Physical Sidelink Broadcast Channel (PSBCH). The mapping or associating, an association period is based on a period of PRS. The association period associates a PRS period in the set of the positioning configuration(s) with a data period in set of the data configuration(s).

Resource Configuration Mapping

When a sidelink data radio bearer (DRB) addition is due based on the configuration by RRCReconfigurationSidelink, it may be up to UE implementation to select the sidelink DRB configuration as necessary transmitting parameters for the sidelink DRB. This may be from the received sl-ConfigDedicatedNR (if in RRC_CONNECTED), SIB12 (if in RRC_IDLE/INACTIVE), SidelinkPreconfigNR (if out of coverage) with the same RLC mode as the one configured in RRCReconfigurationSidelink.

Figure 12A:
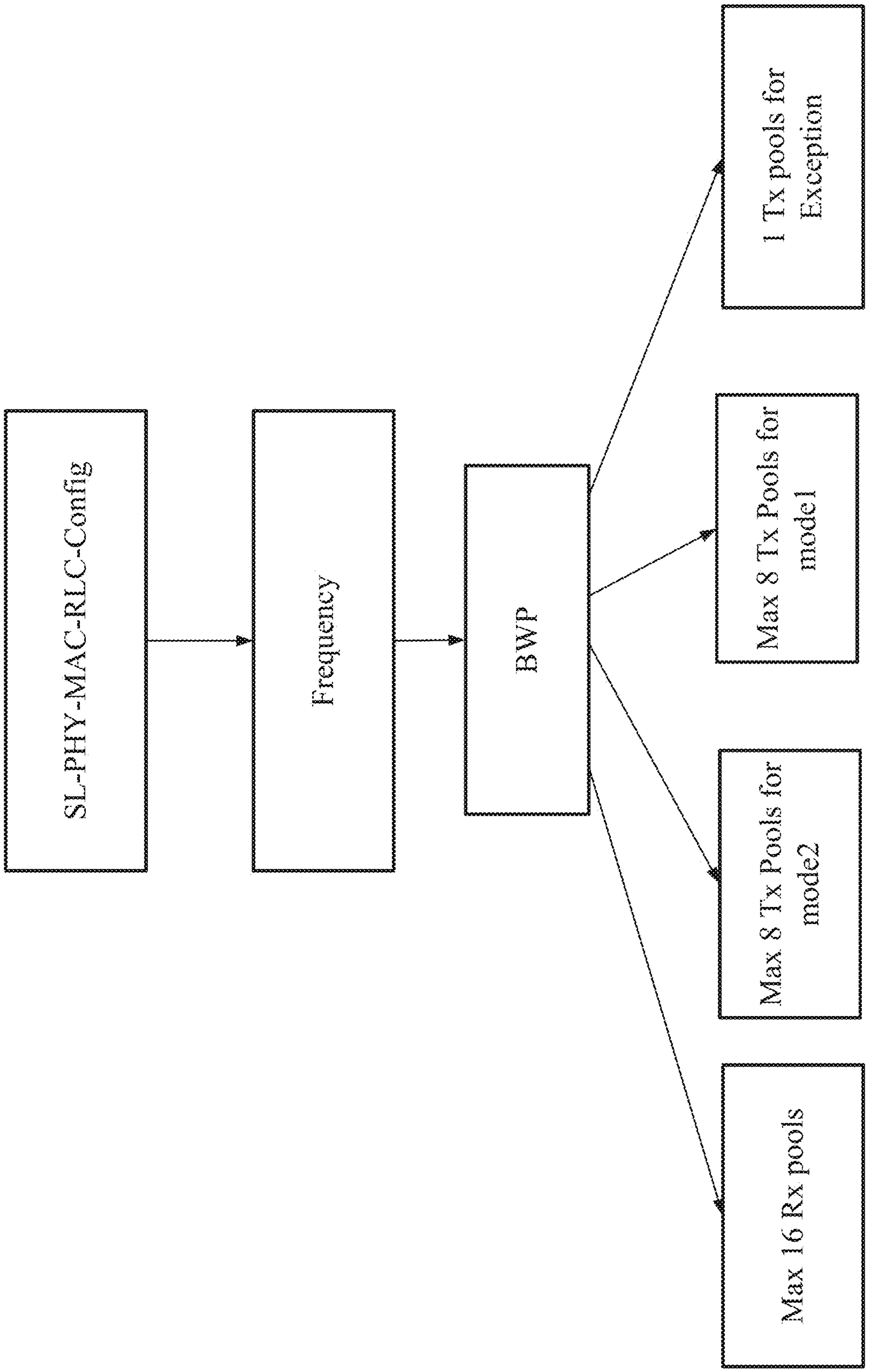
FIG. 12*a* shows an example of resource configuration for mapping communicated in sidelink communications.

FIG. 12*a* shows an example of resource configuration for mapping communicated in sidelink communications. In particular, FIG. 12*a* is one example of a structural organization for the resource configuration for the information element (IE) SL-ConfigDedicatedNR, which specifies the dedicated configuration information for new radio (NR) sidelink communications. The frequency (i.e. carrier frequency) and bandwidth part (BWP) are part of the configuration of which there may be two modes with a maximum number of Tx Pools or Rx pools.

Figure 12B:
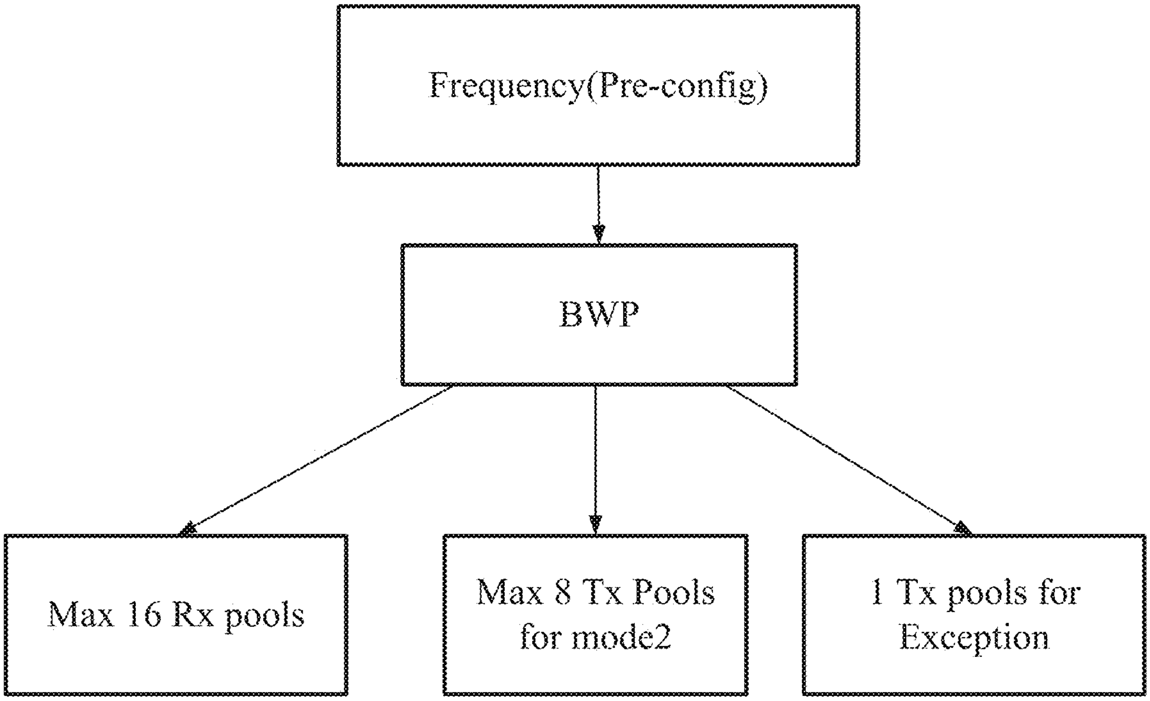
FIG. 12*b* shows another example of resource configuration for mapping communicated in sidelink communications.

FIG. 12*b* shows another example of resource configuration for mapping communicated in sidelink communications. In particular, FIG. 12*b* is another example of a structural organization for the resource configuration that includes a pre-configured frequency (i.e. carrier frequency), but is otherwise similar to FIG. 12*a* except it does not specify a maximum of 8 time (Tx) pools in a first mode (Model1) and SL-PHY-MAC-RLC-Config above the frequency (i.e. carrier frequency).

Figure 12C:
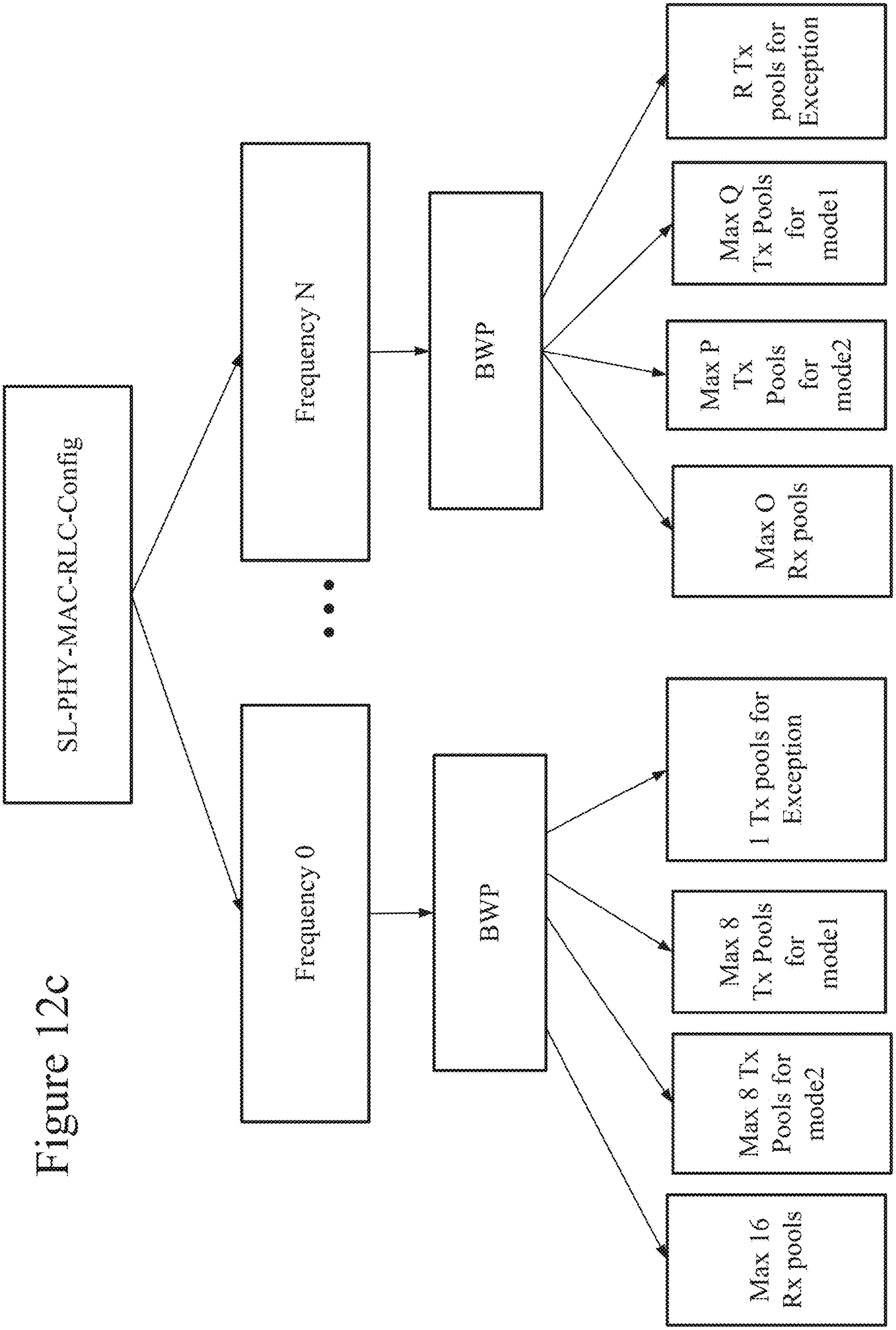
FIG. 12*c* shows another example of resource configuration for mapping communicated in sidelink communications s.

FIG. 12*c* shows another example of resource configuration for mapping communicated in sidelink communications. In particular, FIG. 12*c* includes a configuration of carrier frequency level and carrier frequency/resource pool level mapping. In this embodiment, the carrier frequency can be configured as compared with FIG. 12*a*. As the PRS is utilized in sidelink, that structure of the resource configuration for (carrier) frequency level mapping (where N, O, P, Q, R are integers). In particular, there are additional carrier frequencies. Frequency 0 to Frequency N may refer to the carrier frequency for data when there is one or more carrier frequency should be configured. The signaling may be active at one or more carrier frequencies. In some embodiments, the number of the Rx pools, Tx pools for mode1, Tx pools for mode2, and Tx pool for Exception can be configured or be by default. At least one of the type resource pools may be included: Rx pools, Tx pools for mode1, Tx pools for mode2, and Tx pool for Exception. The mapping may be configured by a high layer parameter, control signaling, or be by default.

In some embodiments, the mapping may include: (1) the mapping ratio of data (carrier) frequency(ies) to PRS (carrier) frequency(ies) as a ratio of 1:1, 1:2, 1:N or M:N, where M and N are integers; or (2) the mapping ratio of data pool resource(s) to PRS pool resource(s), which is further described below. For example, the data Rx pool resource(s) mapping to the PRS Rx pool resource(s) may have a ratio of: A:B, where A<=16, where A,B are integers. The data Tx pool resource(s) for mode2 mapping to the PRS Tx pool resource(s) for mode2 may have a mapping ratio of: A:B, where A<=8, A, B are integers. The data Tx pool resource(s) for mode1 mapping to the PRS Tx pool resource(s) for mode1 may have a mapping ratio of: A:B, where A<=8, A, B are integers. The data Tx pool resource(s) for Exception mapping to the PRS Tx pool resource(s) may have a mapping ratio of: A:B, where A<=1, A, B are integers. The one or more carrier frequencies may be introduced in sidelink for positioning.

Figure 12D:
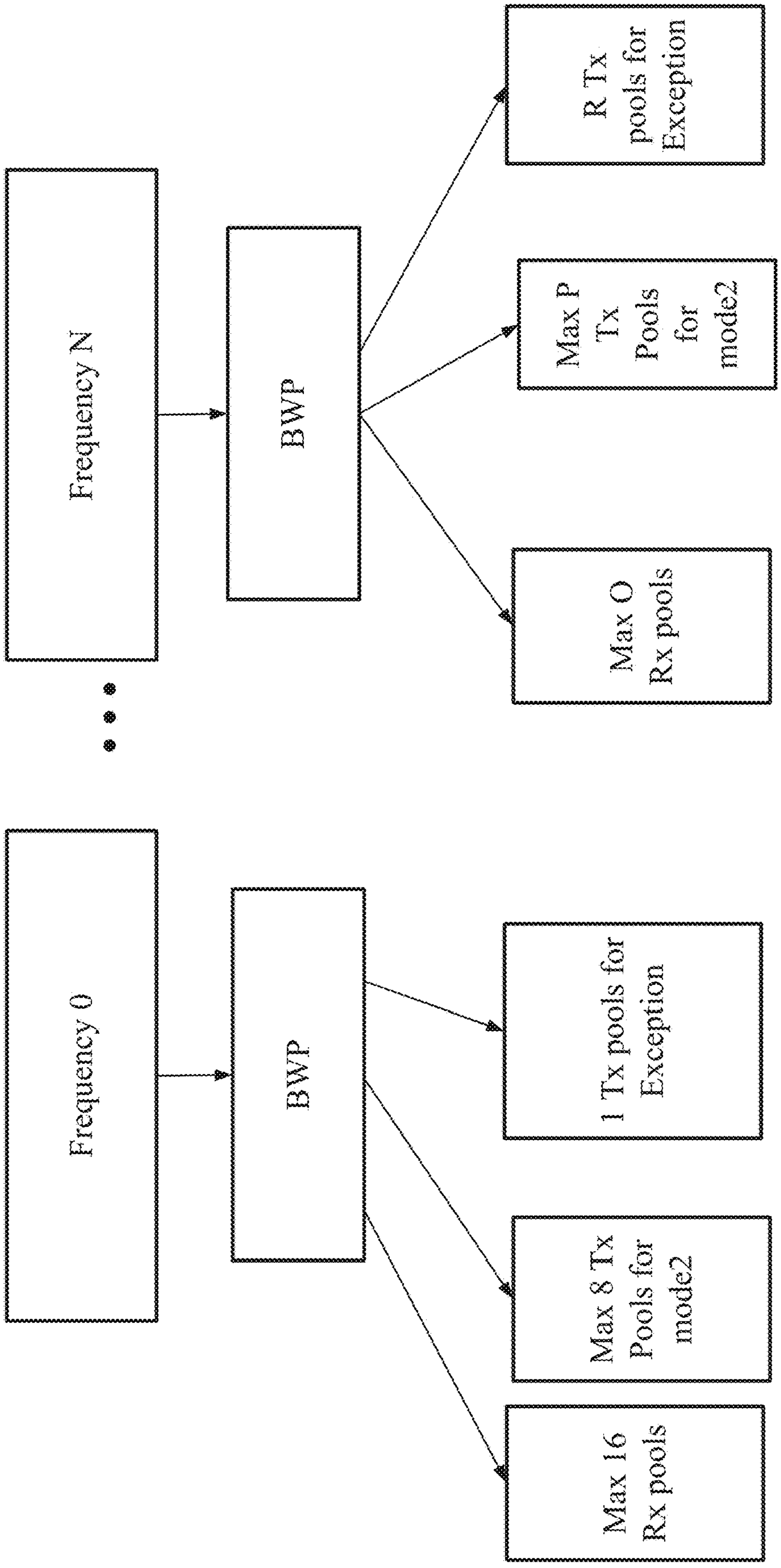
FIG. 12*d* shows another example of resource configuration for mapping communicated in sidelink communications.

FIG. 12*d* shows another example of resource configuration for mapping communicated in sidelink communications. In this embodiment, the carrier frequency can be configured as compared with FIG. 12*b*. FIG. 12*d* shows the structure with different frequencies, or the structure of the resource configuration for frequency level mapping (where N, O, P, and R are integers).

Frequency 0 to Frequency N may refer to the carrier frequency for data when there is one or more carrier frequency should be configured. The signaling may be active at one or more carrier frequencies. The mapping ratio of data carrier frequency to PRS carrier frequency is at least one of: 1:1, 1:2, 1:N or M:N, where M and N are integers. The number of the Rx pools, Tx pools for mode2, or Tx pool for Exception can be configured or set by default. At least one of the types of resource pools may include: Rx pools, Tx pools for mode2, or Tx pool for Exception. The mapping may be configured by a high layer parameter or be by default.

In some embodiments, the mapping may include: (1) the mapping ratio of data carrier frequencies to PRS carrier frequencies as a ratio of 1:1, 1:2, 1:N; or (2) the mapping ratio of data pool resource(s) to PRS pool resource(s), which is further described below. For example, the data Rx pool resource(s) mapping to the PRS Rx pool resource(s) may have a ratio of: A:B, where A<=16, A, B are integers. The data Tx pool resource(s) for mode2 mapping to the PRS Tx pool resource(s) for mode2 may have a mapping ratio of: A:B, where A<=8, A, B are integers. The data Tx pool resource(s) for mode1 mapping to the PRS Tx pool resource(s) for mode1 may have a mapping ratio of: A:B, where A<=8, A, B are integers. The data Tx pool resource(s) for Exception mapping to the PRS Tx pool resource(s) may have a mapping ratio of: A:B, where A<=1, A, B are integers. The one or more carrier frequencies may be introduced in sidelink for positioning.

Figure 12E:
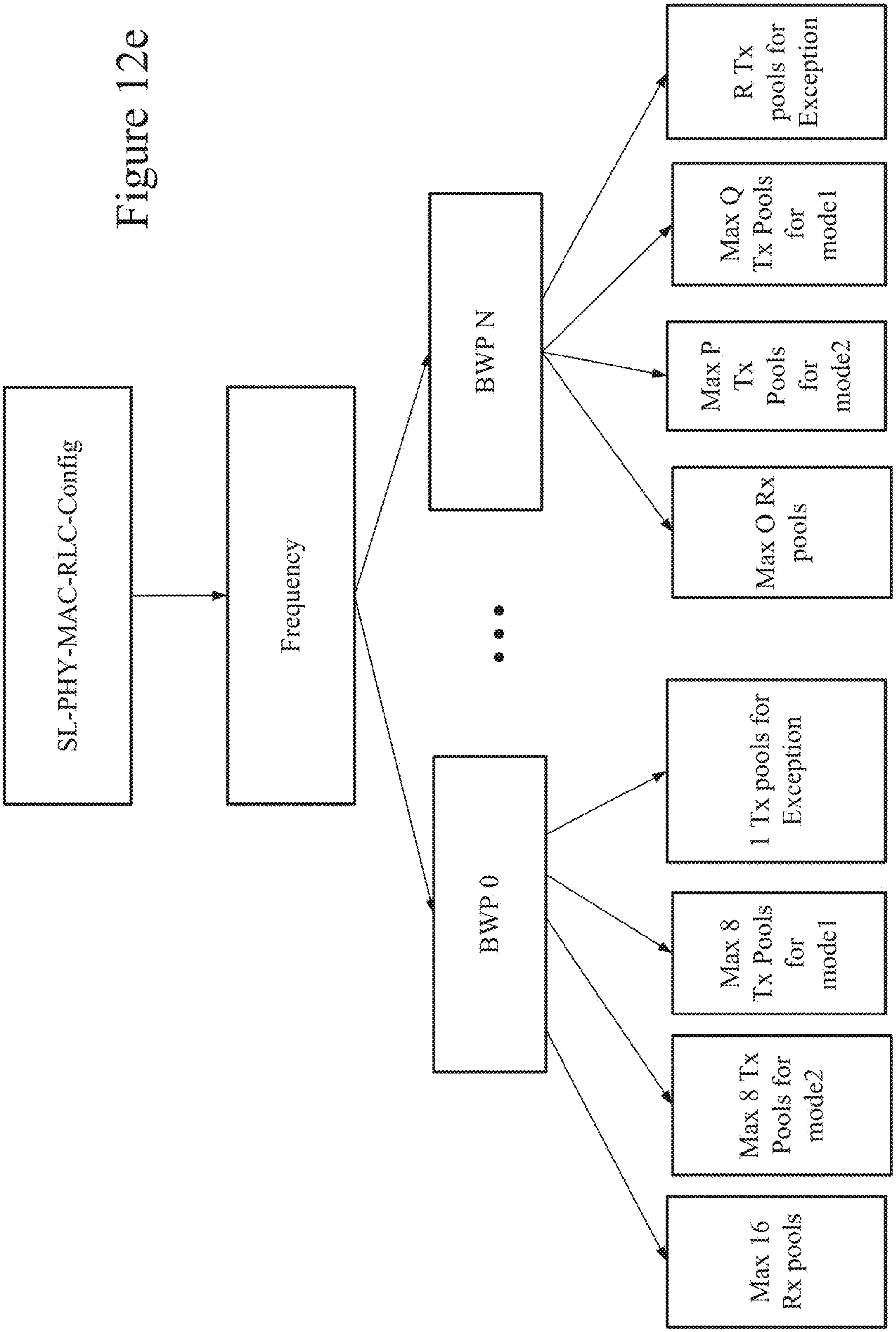
FIG. 12*e* shows another example of resource configuration for mapping communicated in sidelink communications.

FIG. 12*e* shows another example of resource configuration for mapping communicated in sidelink communications. In particular, FIG. 12*e* includes a configuration of bandwidth part (BWP) levels and resource pool level mapping. In this embodiment, the BWP can be configured as compared with FIG. 12*a* or FIG. 12*c* (where frequency was configured). As the PRS is utilized in sidelink, that structure of the resource configuration for BWP level mapping (where N, O, P, Q, R are integers). In particular, there are additional BWP levels.

BWP 0 to BWP N may refer to the level for data when there is one or more configured. The signaling may be active at one or more BWPs. The number of the Rx pools, Tx pools for mode1, Tx pools for mode2, or Tx pool for Exception can be configured or set by default. At least one of the types of resource pools may include: Rx pools, Tx pools for mode1, Tx pools for mode2, or Tx pool for Exception. The mapping may be configured by a high layer parameter, control signaling or be by default.

In some embodiments, the mapping may include: (1) the mapping ratio of data BWP(s) to PRS BWP(s) is a ratio of 1:1, 1:2, 1:N, or M:N, where M and N are integers; or (2) the mapping ratio of data pool resource(s) to PRS pool resource(s), which is further described below. For example, the data Rx pool resource(s) mapping to the PRS Rx pool resource(s) may have a ratio of: A:B, where A<=16, A, B are integers. The data Tx pool resource(s) for mode2 mapping to the PRS Tx pool resource(s) for mode2 may have a mapping ratio of: A:B, where A<=8, A, B are integers. The data Tx pool resource(s) for mode1 mapping to the PRS Tx pool resource(s) for mode1 may have a mapping ratio of: A:B, where A<=8, A, B are integers. The data Tx pool resource(s) for Exception mapping to the PRS Tx pool resource(s) may have a mapping ratio of: A:B, where A<=1, A, B are integers. The one or more BWPs may be introduced in sidelink for positioning.

Figure 12F:
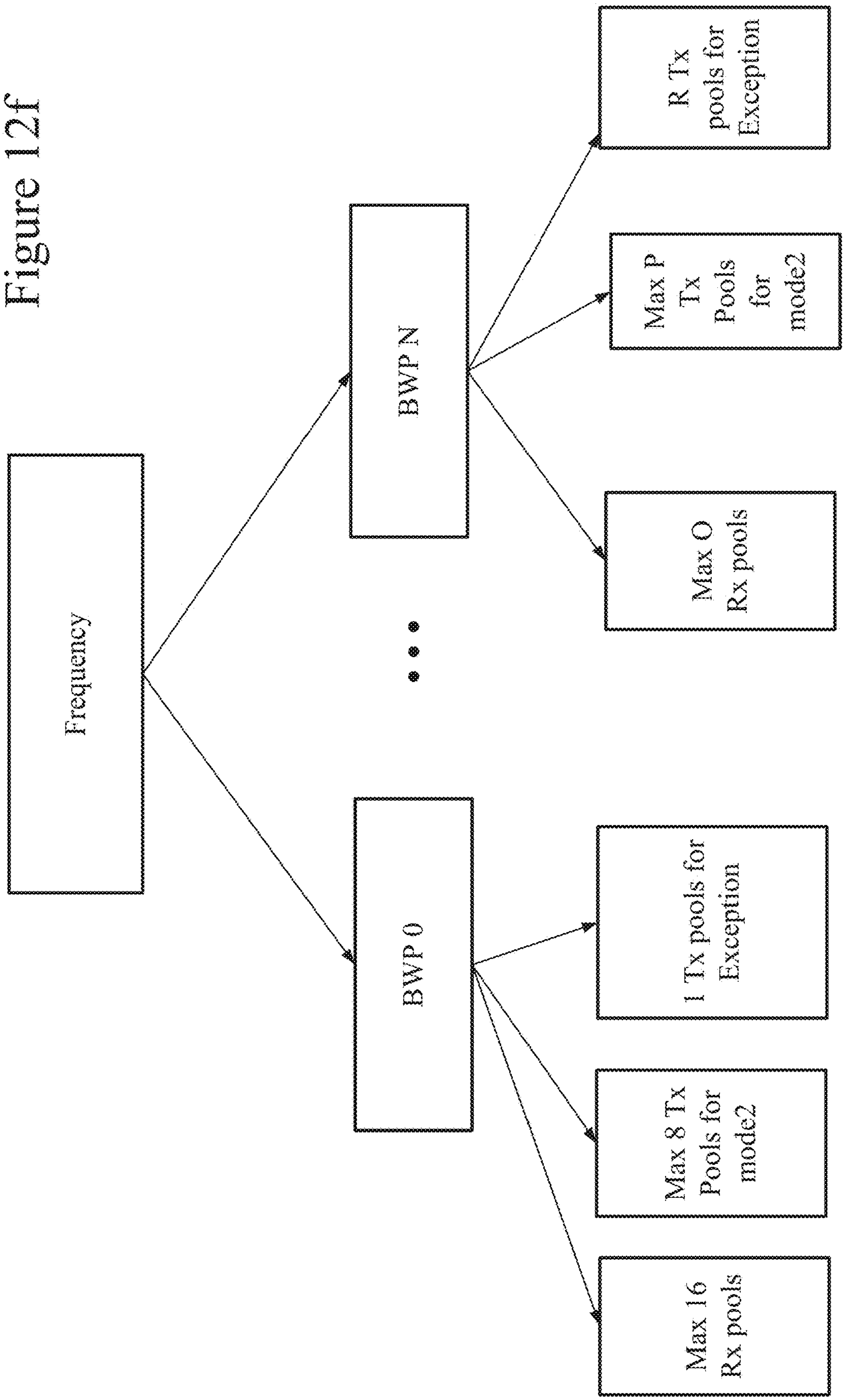
FIG. 12*f* shows another example of resource configuration for mapping communicated in sidelink communications.

FIG. 12*f* shows another example of resource configuration for mapping communicated in sidelink communications. In particular, FIG. 12*f* includes a configuration of bandwidth part (BWP) levels and resource pool level mapping. In this embodiment, the BWP can be configured as compared with FIG. 12*b* or FIG. 12*d* (where frequency was configured). As the PRS is utilized in sidelink, that structure of the resource configuration for BWP level mapping (where N, O, P, Q, R are integers). In particular, there are additional BWP levels.

BWP 0 to BWP N may refer to the level for data when there is one or more configured. The signaling may be active at one or more BWPs or carrier frequencies. The number of the Rx pools, Tx pools for mode2, or Tx pool for Exception can be configured or set by default. At least one of the types of resource pools may include: Rx pools, Tx pools for mode2, or Tx pool for Exception. The mapping may be configured by a high layer parameter or be by default. The mapping ratio of data carrier frequency to PRS carrier frequency is 1:N, where the other BWP(s) is mapped to another.

In some embodiments, the mapping may include: (1) the mapping ratio of data BWP(s) to PRS BWP(s) is a ratio of 1:1, 1:2, 1:N, or M:N, where M and N are integers; or (2) the mapping ratio of data pool resource(s) to PRS pool resource(s), which is further described below. For example, the data Rx pool resource(s) mapping to the PRS Rx pool resource(s) may have a ratio of: A:B, where A<=16, A, B are integers. The data Tx pool resource(s) for mode2 mapping to the PRS Tx pool resource(s) for mode2 may have a mapping ratio of: A:B, where A<=8, A, B are integers. The data Tx pool resource(s) for mode1 mapping to the PRS Tx pool resource(s) for mode1 may have a mapping ratio of: A:B, where A<=8, A, B are integers. The data Tx pool resource(s) for Exception mapping to the PRS Tx pool resource(s) may have a mapping ratio of: A:B, where A<=1, A, B are integers. The one or more BWPs may be introduced in sidelink for positioning.

Figure 12G:
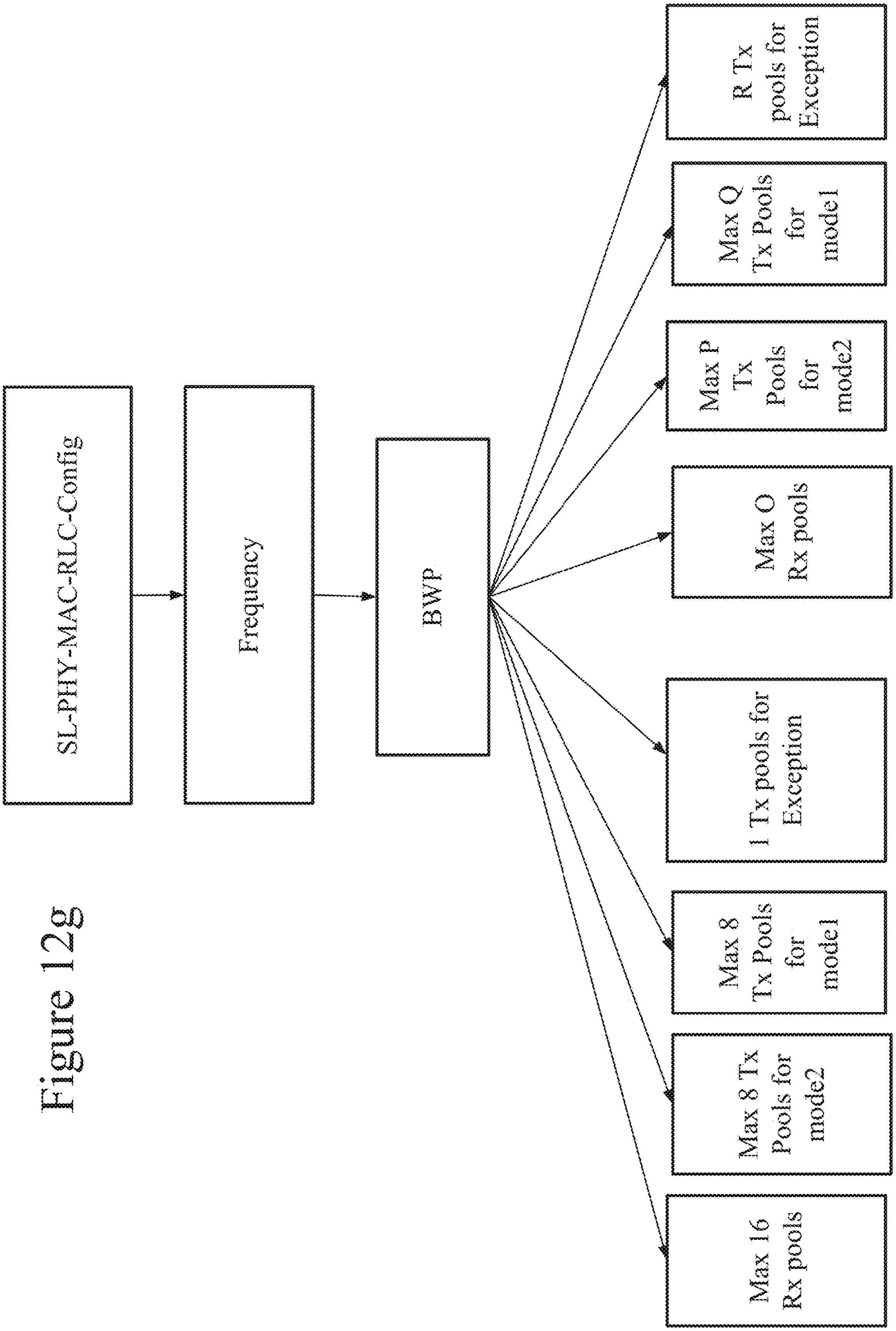
FIG. 12*g* shows another example of resource configuration for mapping communicated in sidelink communications.

FIG. 12*g* shows another example of resource configuration for mapping communicated in sidelink communications. In this embodiment, the resource pool level can be configured with resource pool level mapping. As the PRS is utilized in sidelink, that structure of the resource configuration for resource pool level mapping (where N, O, P, Q, R are integers).

The number of the Rx pools, Tx pools for mode2, and Tx pool for Exception can be configured or set by default. PRS resource pool(s) and at least one of the type resource pool may include: Rx pools, Tx pools for mode1, Tx pools for mode2, or Tx pool for Exception. The mapping may be configured by a high layer parameter or be by default.

In some embodiments, the mapping may include the mapping ratio of data pool resource(s) to PRS pool resource(s). The data Rx pool resource(s) mapping to the PRS Rx pool resource(s) may have a ratio of: A:B, where A<=16, A, B are integers. The data Tx pool resource(s) for mode2 mapping to the PRS Tx pool resource(s) for mode2 may have a mapping ratio of: A:B, where A<=8, A, B are integers. The data Tx pool resource(s) for mode1 mapping to the PRS Tx pool resource(s) for mode1 may have a mapping ratio of: A:B, where A<=8, A, B are integers. The data Tx pool resource(s) for Exception mapping to the PRS Tx pool resource(s) may have a mapping ratio of: A:B, where A<=1, A, B are integers.

Figure 12H:
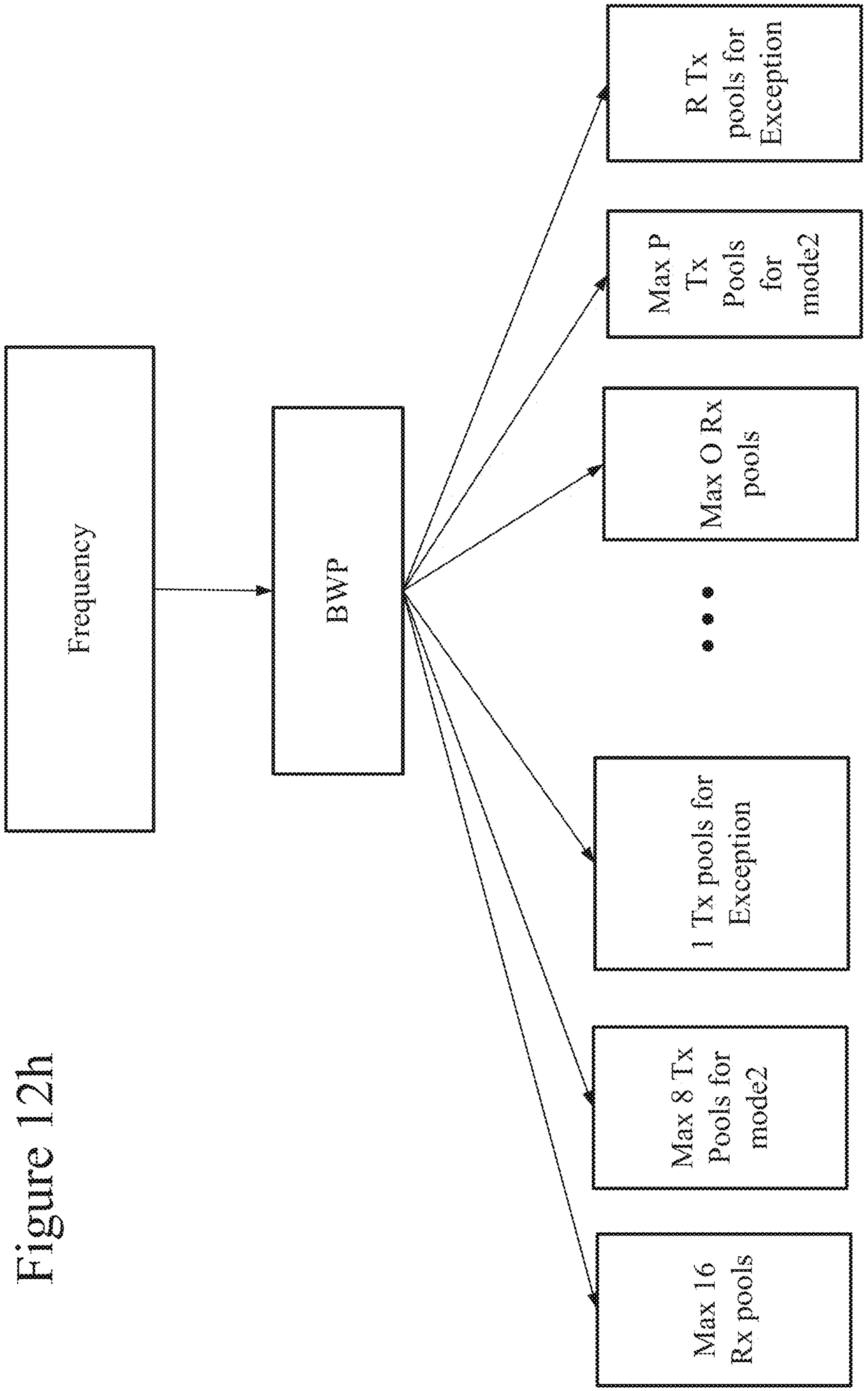
FIG. 12*h* shows another example of resource configuration for mapping communicated in sidelink communications.

FIG. 12*h* shows another example of resource configuration for mapping communicated in sidelink communications. In this embodiment, the resource pool level can be configured with resource pool level mapping. As the PRS is utilized in sidelink, that structure of the resource configuration for resource pool level mapping (where N, O, P, Q, R are integers). The mapping may be configured by a high layer parameter or be by default.

In some embodiments, the mapping may include the mapping ratio of data pool resource(s) to PRS pool resource(s). The data Rx pool resource(s) mapping to the PRS Rx pool resource(s) may have a ratio of: A:B, where A<=16, A, B are integers. The data Tx pool resource(s) for mode2 mapping to the PRS Tx pool resource(s) for mode2 may have a mapping ratio of: A:B, where A<=8, A, B are integers. The data Tx pool resource(s) for Exception mapping to the PRS Tx pool resource(s) may have a mapping ratio of: A:B, where A<=1, A, B are integers.

In some embodiments for FIGS. 12*a*-12*h*, if a configuration is not mapped, the configuration may be invalid. Further, if a configuration is not mapped, then the node may not transmit using the configuration. Further, if a configuration is not mapped, then the node with this configuration may do the sensing and selecting on its own.

In some embodiments for FIGS. 12*a*-12*h*, the mapping may be triggered or activated. The trigger/activation may be with a parameter(s) in control signaling, such as MAC CE, RRC, DCI, SCI. In some embodiments, the parameter may be indicated in the bitmap manner. In some embodiments, '1' signifies the activation, while '0' signifies the deactivation. In some embodiments, the parameter may be indicated using a resource ID/Index. In some embodiments, a resource ID/Index may the carrier frequency ID/Index, BWP ID/Index, or resource pool ID/Index.

Resource Configuration Pattern

A resource pool may include at least one of PSSCH, PSCCH, PSFCH, or PRS. PRS may include at least one of the parameters: PRS period, RB set, time gap, or CandidateResourceType. The following is an example capability to calculate position.

```
SL-PRS-Config-r16 ::=        SEQUENCE {
    sl-PRS-Period-r16
    sl-PRS-RB-Set-r16
    sl-NumMuxCS-Pair-r16                         sl-MinTimeGapPRS-
r16
    sl-PRS-HopID-r16
    sl-PRS-CandidateResourceType-r16   ENUMERATED { startSubCH,
allocSubCH}
  }
```

FIGS. 13*a*-13*d* show examples of a PSFCH data pattern in sidelink communications. The configuration of PRS may use a configuration method including using the high layer parameter and SCI, using the high layer, or using the high layer SCI. The period of the PRS may be indicated by high-layer parameter or by default. The PRS symbol may be indicated by DCI, SCI or by default.

Figure 13A:
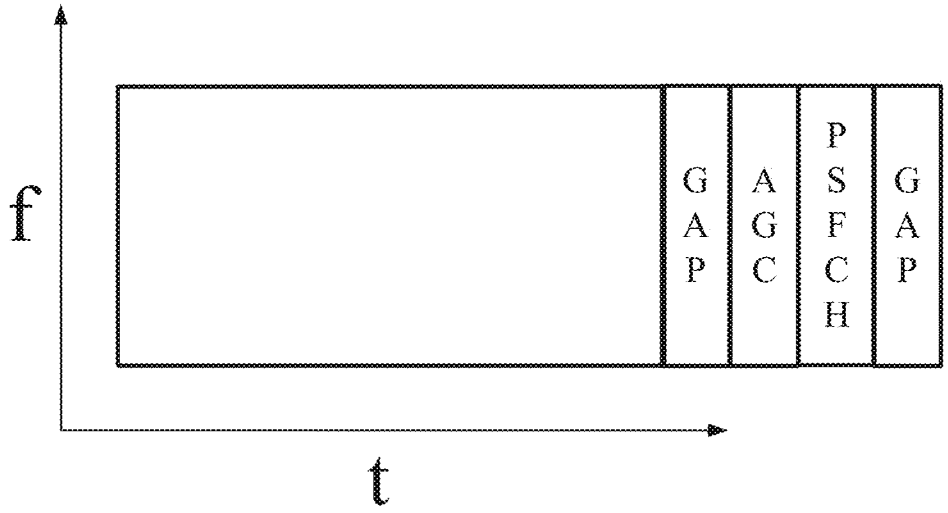
FIG. 13*a* shows an example of a data pattern in sidelink communications.

FIG. 13*a* shows an example of a PSFCH pattern in sidelink communications. It is one example of a PSFCH pattern in sidelink communications. FIG. 13*a* shows one arrangement with gaps, an automatic gain control (AGC) and a Physical Sidelink Feedback Channel (PSFCH).

Figure 13B:
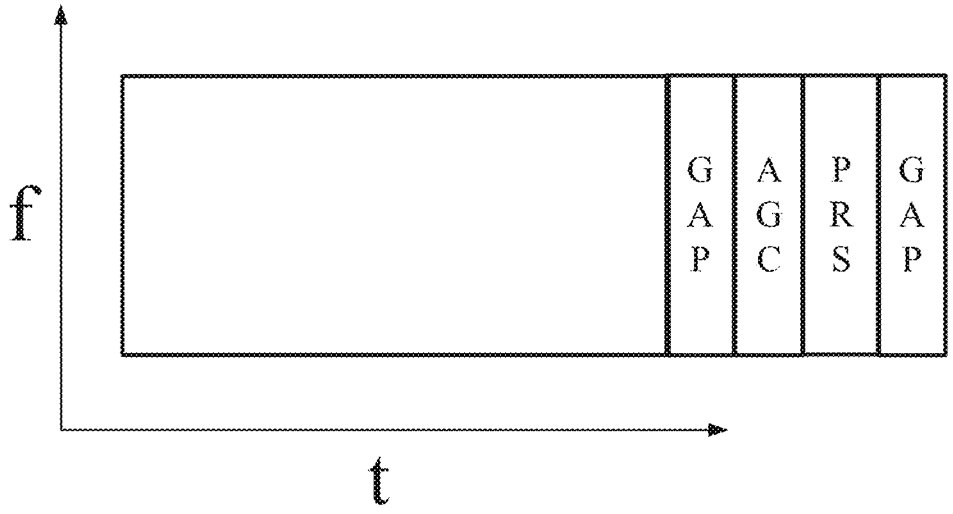
FIG. 13*b* shows another example of a data pattern in sidelink communications.

FIG. 13*b* shows another example of a PRS pattern in sidelink communications. It is an example of a PRS pattern in sidelink communications. FIG. 13*b* shows one arrangement with gaps, an automatic gain control (AGC) and a positioning reference signal (PRS), which pattern may be associated with the PSFCH pattern in FIG. 13*a*.

Figure 13C:
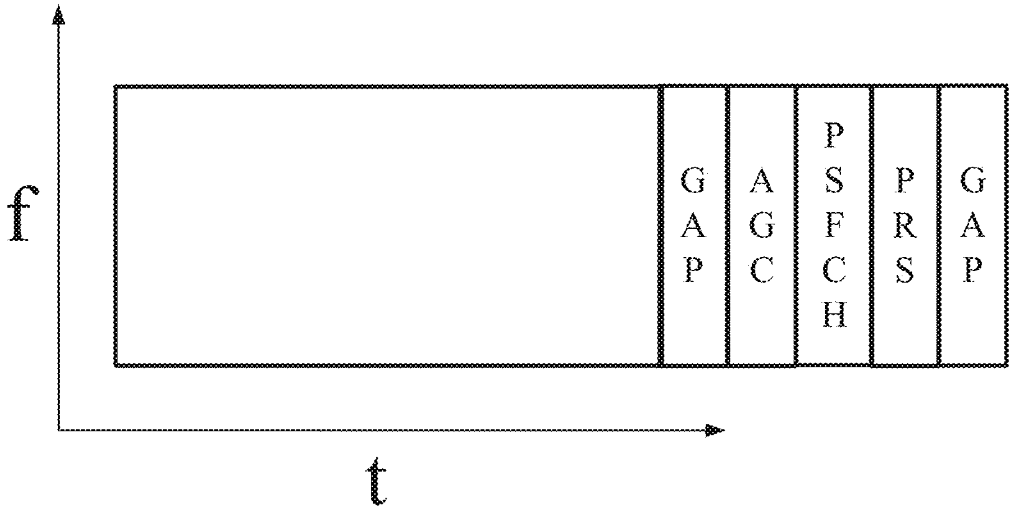
FIG. 13*c* shows another example of a data pattern in sidelink communications.

FIG. 13*c* shows another example of a PRS pattern in sidelink communications. It is another example of a PRS pattern in sidelink communications. FIG. 13*c* shows one arrangement with gaps, an automatic gain control (AGC), a Physical Sidelink Feedback Channel (PSFCH), and a positioning reference signal (PRS). The PRS and the PSFCH are in a slot, but in a different time domain, and PSFCH and PRS are in the same frequency domain. PRS is in front of the PSFCH in the time domain.

Figure 13D:
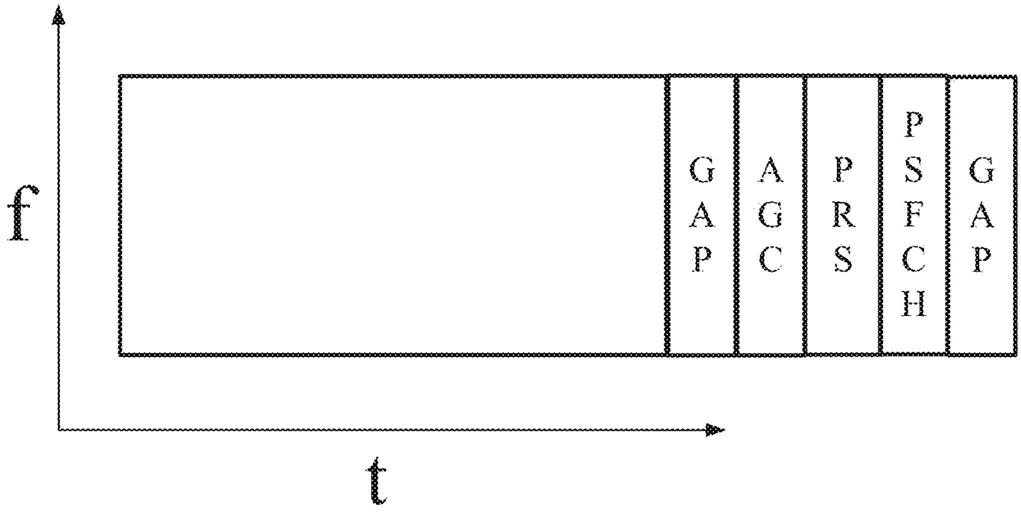
FIG. 13*d* shows another example of a data pattern in sidelink communications.

FIG. 13*d* shows another example of a PRS pattern in sidelink communications. It is another example of a PRS pattern in sidelink communications. FIG. 13*d* shows one arrangement with gaps, an automatic gain control (AGC), a positioning reference signal (PRS), and a Physical Sidelink Feedback Channel (PSFCH). The PRS and the PSFCH are in a slot, but in a different time domain, and PSFCH and PRS are in the same frequency domain. The PSFCH is in front of the PRS in the time domain.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for wireless communication, comprising:

receiving, by a second user equipment (UE), first sidelink information from a first user equipment, wherein the first sidelink information comprises a side-link positioning reference signal (SL-PRS) configuration, and the SL-PRS configuration comprises a SL-PRS sequence ID for initializing a value in a pseudo random generator for generation of a SL-PRS sequence for transmission on a SL-PRS Resource;

sending, by the second user equipment, second sidelink information to the first user equipment, wherein the second sidelink information is used for positioning and comprises a Rx-Tx time difference measured by the second user equipment and a granularity for the Rx-Tx time difference measurement.

2. The method of claim 1, wherein the first sidelink information comprises a response time.

3. The method of claim 1, wherein the second sidelink information further comprises at least one of: location information, a UE capability, or a reference signal received power (RSRP).

4. The method of claim 3, wherein the UE capability comprises a capability of supporting a positioning method.

5. The method of claim 4, wherein the positioning method comprises a Round Trip Time (RTT).

6. The method of claim 1, wherein the SL-PRS configuration is indicated in control signaling, and the control signaling comprises Non Access Stratum (NAS).

7. A method for wireless communication, comprising:

sending, by a first user equipment (UE), first sidelink information to a second user equipment, wherein the first sidelink information comprises a side-link positioning reference signal (SL-PRS) configuration, and the SL-PRS configuration comprises a SL-PRS sequence ID for initializing a value in a pseudo random generator for generation of a SL-PRS sequence for transmission on a SL-PRS Resource;

receiving, by the first user equipment, second sidelink information from the second user equipment, wherein the second sidelink information is used for positioning comprises a Rx-Tx time difference measured by the second user equipment and a granularity for the Rx-Tx time difference measurement.

8. The method of claim 7, wherein the first sidelink information comprises a response time.

9. The method of claim 7, wherein the second sidelink information further comprises at least one of: location information, a UE capability, or a reference signal received power (RSRP).

10. The method of claim 9, wherein the UE capability comprises a capability of supporting a positioning method.

11. The method of claim 10, wherein the positioning method comprises at least a Round Trip Time (RTT).

12. The method of claim 7, wherein the SL-PRS configuration is indicated in control signaling, and the control signaling comprises Non Access Stratum (NAS).

13. A wireless communication device, comprising at least one processor configured to:

receive first sidelink information from a user equipment, wherein the first sidelink information comprises a side-link positioning reference signal (SL-PRS) configuration, and the SL-PRS configuration comprises a SL-PRS sequence ID for initializing a value in a pseudo random generator for generation of a SL-PRS sequence for transmission on a SL-PRS Resource;

send second sidelink information to the user equipment, wherein the second sidelink information is used for positioning and comprises a Rx-Tx time difference measured by the wireless communication device and a granularity for the Rx-Tx time difference measurement.

14. The device of claim 13, wherein the first sidelink information comprises a response time.

15. The device of claim 13, wherein the second sidelink information further comprises at least one of: location information, a UE capability, or a reference signal received power (RSRP).

16. A wireless communication device, comprising at least one processor configured to implement a method of claim 7.

* * * * *